United States Patent
Wang et al.

(10) Patent No.: US 12,231,282 B2
(45) Date of Patent: Feb. 18, 2025

(54) SIGNAL PROCESSING METHOD AND RELATED APPARATUS

(71) Applicant: Huawei Technologies Co., Ltd., Shenzhen (CN)

(72) Inventors: Xiaolu Wang, Hangzhou (CN); Hejia Luo, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 18/303,038

(22) Filed: Apr. 19, 2023

(65) Prior Publication Data

US 2023/0308337 A1 Sep. 28, 2023

Related U.S. Application Data

(63) Continuation of application No. PCT/CN2021/124739, filed on Oct. 19, 2021.

(30) Foreign Application Priority Data

Oct. 20, 2020 (CN) .......................... 202011128081.5

(51) Int. Cl.
*H04L 27/36* (2006.01)
*H04L 27/38* (2006.01)

(52) U.S. Cl.
CPC .............. *H04L 27/36* (2013.01); *H04L 27/38* (2013.01)

(58) Field of Classification Search
CPC ........................... H04L 27/36; H04L 27/0004
See application file for complete search history.

(56) References Cited

U.S. PATENT DOCUMENTS

2004/0228273 A1* 11/2004 Kurobe ............... H04L 1/188
 370/210

FOREIGN PATENT DOCUMENTS

CN 109743107 A 5/2019

OTHER PUBLICATIONS

3GPP TR 38.821 V1.0.0 (Dec. 2019),3rd Generation Partnership Project; Technical Specification Group Radio Access Network; Solutions for NR to support non-terrestrial networks (NTN) (Release 16), total 143 pages.

* cited by examiner

*Primary Examiner* — Rahel Guarino
(74) *Attorney, Agent, or Firm* — Slater Matsil, LLP

(57) ABSTRACT

A method includes: A transmit end obtains P QAM symbols; the transmit end performs IDWT or DWT on the P QAM symbols, to obtain a first signal matrix with N rows and M columns, and transposes the first signal matrix, to obtain a transposed first transpose matrix, where P, N, and M are all positive integers; and the transmit end outputs the transposed first transpose matrix. Correspondingly, a receive end obtains a second signal matrix with M rows and N columns; the receive end transposes the second signal matrix, to obtain a transposed second transpose matrix; and performs DWT or IDWT on the second transpose matrix, to obtain P QAM symbols.

20 Claims, 30 Drawing Sheets

Satellite: satellite
Beam reference point: beam reference point
Earth center: earth center
UE: user equipment BER: bit error rate
SNR: signal-to-noise ratio dB: decibel
OFDM-double dispersive channel: OFDM-double dispersive channel
OFDM-no Doppler: OFDM-no Doppler
OFDM: orthogonal frequency division multiplexing BER: bit error rate
SNR: signal-to-noise ratio
OFDM: orthogonal frequency division multiplexing
IDWT-T: inverse discrete wavelet transform-transmit end BER: bit error rate
SNR: signal-to-noise ratio
OFDM: orthogonal frequency division multiplexing
IDWT-T: inverse discrete wavelet transform-transmit end PAPR: peak to average power ratio
OFDM: orthogonal frequency division multiplexing
IDWT-T: inverse discrete wavelet transform-transmit end
Probability: probability BER: bit error rate
SNR: signal-to-noise ratio
OFDM: orthogonal frequency division multiplexing
2-level-IDWT-T: 2-level-inverse discrete wavelet transform-transmit end BER: bit error rate
SNR: signal-to-noise ratio
OFDM: orthogonal frequency division multiplexing
DWT-T: discrete wavelet transform-transmit end

SIGNAL PROCESSING METHOD AND RELATED APPARATUS

CROSS-REFERENCE TO RELATED APPLICATIONS

This application is a continuation of International Application No. PCT/CN2021/124739, filed on Oct. 19, 2021, which claims priority to Chinese Patent Application No. 202011128081.5, filed on Oct. 20, 2020. The disclosures of the aforementioned applications are hereby incorporated by reference in their entireties.

TECHNICAL FIELD

This application relates to the field of communication technologies, and in particular, to a signal processing method and a related apparatus.

BACKGROUND

When a high-velocity motion occurs between user equipment (UE) and a base station (BS), a large Doppler shift occurs in a signal received by a receive end. Usually, when a radio signal is propagated on a radio channel, multipath effect occurs. Therefore, when there are a plurality of paths between the UE and the base station, the signal received by the receive end is superposition of signals propagated on all the paths, the Doppler shift occurs in the signal propagated on each path, and a Doppler spread, that is, frequency dispersion, occurs on the plurality of paths. Due to the multipath effect of signal propagation, the signals on all the paths cannot simultaneously reach the receive end, and a time spread, that is, time dispersion, occurs in the received signal.

Therefore, when the communication channel has the plurality of paths, and the high-velocity motion occurs between the UE and the base station, impact of time-frequency double dispersion is brought, which greatly affects decoding performance of the receive end and communication reliability.

SUMMARY

Embodiments of this application provide a signal processing method and a related apparatus, to reduce impact of time-frequency double dispersion on a receive end, and improve decoding performance of the receive end and communication reliability.

The following describes this application from different aspects. It should be understood that implementations and beneficial effect according to the following different aspects may refer to each other.

According to a first aspect, this application provides a signal processing method, applied to a communication scenario in which impact of time-frequency double dispersion exists. The signal processing method may be implemented at a transmit end. The signal processing method includes: obtaining P quadrature amplitude modulation (QAM) symbols; performing inverse discrete wavelet transform (IDWT) or discrete wavelet transform (DWT) on the P QAM symbols, to obtain a first signal matrix with N rows and M columns, and transposing the first signal matrix, to obtain a transposed first transpose matrix; and outputting the transposed first transpose matrix. P, N, and M are all positive integers, P is a positive integer greater than 1, N and M are both positive integers greater than or equal to 1, and N and M cannot be both 1. P may be greater than or equal to N multiplied by M.

Optionally, one column of the first signal matrix is obtained by performing the IDWT or the DWT on N QAM symbols in the P QAM symbols; or one row of the first signal matrix is obtained by performing the IDWT or the DWT on M QAM symbols in the P QAM symbols.

In this solution, the IDWT/DWT and transpose operation are used at the transmit end to process the signal, and a corresponding transpose operation and DWT/IDWT are used at a receive end to process a received signal, so that Doppler impact on the signal sent by the transmit end on a radio channel is averaged or randomized, and a signal on each carrier can be more evenly affected during decoding at the receive end. Therefore, decoding performance of the receive end and communication reliability are improved.

With reference to the first aspect, in a possible design, after the outputting the transposed first transpose matrix, the method further includes: determining a first signal based on the first transpose matrix, where the first signal is a one-dimensional data stream, and the first signal includes N*M transformed symbols; and sending the first signal.

Optionally, when the first signal is determined based on the first transpose matrix, the first signal is output based on a column of the first transpose matrix; or the first signal is output based on a row of the first transpose matrix.

According to a second aspect, this application provides a signal processing method, applied to a communication scenario in which impact of time-frequency double dispersion exists. The signal processing method may be implemented at a receive end. The signal processing method includes: obtaining a second signal matrix with M rows and N columns; transposing the second signal matrix, to obtain a transposed second transpose matrix; and performing discrete wavelet transform DWT or inverse discrete wavelet transform IDWT on the second transpose matrix, to obtain P quadrature amplitude modulation QAM symbols. P, N, and M are all positive integers, P is a positive integer greater than 1, N and M are both positive integers greater than or equal to 1, and N and M cannot be both 1. P may be greater than or equal to N multiplied by M.

Optionally, the second transpose matrix has N rows and M columns. N QAM symbols in the P QAM symbols are obtained by performing the DWT or the IDWT on one column of the second transpose matrix; or M QAM symbols in the P QAM symbols are obtained by performing the DWT or the IDWT on one row of the second transpose matrix.

In this solution, the IDWT/DWT and transpose operation are used at a transmit end to process the signal, and a corresponding transpose operation and DWT/IDWT are used at the receive end to process a received signal, so that Doppler impact on the signal sent by the transmit end on a radio channel is averaged or randomized, and a signal on each carrier can be more evenly affected during decoding at the receive end. Therefore, decoding performance of the receive end and communication reliability are improved.

With reference to the second aspect, in a possible design, before the obtaining a second signal matrix with M rows and N columns, the method further includes: receiving a second signal; equalizing the second signal to obtain a third signal in time domain, where the third signal includes M*N transformed symbols, and the third signal is a one-dimensional data stream; and determining the second signal matrix with the M rows and N columns based on the third signal.

Optionally, when the second signal matrix with the M rows and N columns is determined based on the third signal, the second signal matrix with the M rows and N columns is generated by using every M symbols in the third signal as one column; or the second signal matrix with the M rows and N columns is generated by using every N symbols in the third signal as one row.

According to a third aspect, this application provides a signal processing apparatus. The signal processing apparatus may be a communication device or a chip or a circuit that may be configured to be disposed in the communication device. The signal processing apparatus includes units and/or modules configured to perform the signal processing method according to the first aspect and/or any possible implementation of the first aspect. Therefore, the apparatus can also implement beneficial effect (or advantages) of the signal processing method according to the first aspect.

According to a fourth aspect, this application provides a signal processing apparatus. The signal processing apparatus may be a communication device or a chip or a circuit that may be configured to be disposed in the communication device. The signal processing apparatus includes units and/or modules configured to perform the signal processing method according to the second aspect and/or any possible implementation of the second aspect. Therefore, the apparatus can also implement beneficial effect (or advantages) of the signal processing method according to the second aspect.

According to a fifth aspect, this application provides a communication apparatus. The communication apparatus may include a processor, a transceiver, and a memory. The memory is configured to store a computer program. The transceiver is configured to receive and transmit various signals. The computer program includes program instructions, and when the processor runs the program instructions, the communication apparatus is enabled to perform the signal processing method according to the first aspect, the second aspect, any possible implementation of the first aspect, or any possible implementation of the second aspect. The transceiver may be a radio frequency module in the communication apparatus, a combination of the radio frequency module and an antenna, or an input/output interface of a chip or a circuit.

According to a sixth aspect, this application provides a readable storage medium. The readable storage medium stores program instructions, and when the program instructions are run on a computer, the computer is enabled to perform the signal processing method according to the first aspect, the second aspect, any possible implementation of the first aspect, or any possible implementation of the second aspect.

According to a seventh aspect, this application provides a program product including program instructions, and when the program instructions are run, the signal processing method according to the first aspect, the second aspect, any possible implementation of the first aspect, or any possible implementation of the second aspect is enabled to be performed.

According to an eighth aspect, an embodiment of this application provides an apparatus. The apparatus is implemented in a form of a chip, and the apparatus includes a processor. The processor is configured to read and execute a program stored in a memory, to perform the signal processing method according to one or more of the first aspect and the second aspect, or one or more of any possible implementation of the first aspect or the second aspect. Optionally, the apparatus further includes the memory, and the memory is connected to the processor through a circuit or a wire. Further, optionally, the apparatus further includes a communication interface, and the processor is connected to the communication interface. The communication interface is configured to receive data and/or information that need/needs to be processed. The processor obtains the data and/or the information from the communication interface, processes the data and/or the information, and outputs a processing result through the communication interface. The communication interface may be an input/output interface.

Optionally, the processor and the memory may be physically independent units, or the memory may be integrated with the processor.

According to embodiments of this application, the impact of the time-frequency double dispersion on the receive end can be reduced, and the decoding performance of the receive end and the communication reliability can be improved.

BRIEF DESCRIPTION OF THE DRAWINGS

To describe technical solutions in embodiments of this application more clearly, the following briefly describes accompanying drawings used in describing embodiments.

DETAILED DESCRIPTION OF ILLUSTRATIVE EMBODIMENTS

The following clearly and completely describes technical solutions in embodiments of this application with reference to accompanying drawings in embodiments of this application.

For ease of understanding a signal processing method provided in embodiments of this application, the following describes a system architecture and/or an application scenario of the signal processing method provided in embodiments of this application. It may be understood that the system architecture and/or the application scenario described in embodiments of this application are/is intended to describe the technical solutions in embodiments of this application more clearly, and do/does not constitute a limitation on the technical solutions provided in embodiments of this application.

The signal processing method provided in embodiments of this application may be applied to a wireless communication system, including terrestrial network communication and non-terrestrial network (NTN) communication. The NTN communication includes high-altitude platform communication, aircraft communication, satellite communication, and the like.

Figure 1:
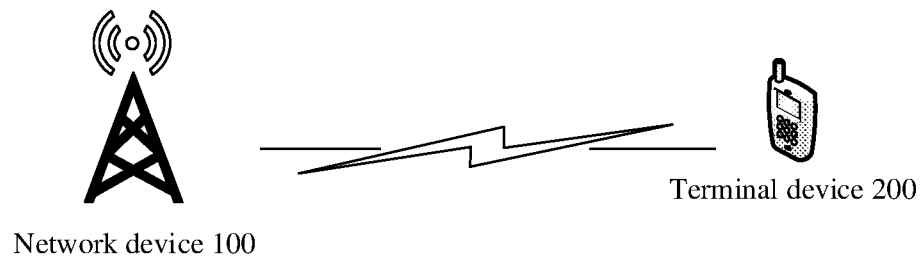
FIG. 1 is a diagram of a system architecture of a wireless communication system according to an embodiment of this application.

FIG. 1 is a diagram of a system architecture of a wireless communication system according to an embodiment of this application. As shown in FIG. 1, the wireless communication system may include at least one network device (for example, a network device 100 in FIG. 1) and at least one terminal device (for example, a terminal device 200 in FIG. 1). The terminal device 200 may be connected to the network device 100 in a wireless manner. A high-velocity motion exists between the terminal device 200 and the network device 100 in this embodiment of this application. Optionally, FIG. 1 is only a schematic diagram. The wireless communication system may further include another device, for example, may further include a core network device, a wireless relay device, and/or a wireless backhaul device, which is not shown in FIG. 1.

Optionally, in actual application, the wireless communication system may simultaneously include a plurality of network devices, or may simultaneously include a plurality of terminal devices. One network device may serve one or more terminal devices at the same time. One terminal device may also be connected to one or more network devices at the same time. A quantity of terminal devices and a quantity of network devices included in the wireless communication system are not limited in this embodiment of this application.

The network device 100 may be an entity, for example, a base station, that is configured to transmit or receive a signal on a network side. Alternatively, the network device may be an access device that is used by a terminal device to access the wireless communication system in a wireless manner. For example, the network device may be a NodeB NodeB, an evolved NodeB (eNB), a transmission reception point (TRP), a next generation NodeB (gNB), a base station in a future communication system, a high-altitude platform, a satellite, or the like. A specific technology and a specific device form that are used by the network device are not limited in this embodiment of this application.

The terminal device 200 may be an entity, for example, mobile phone UE, that is configured to receive or transmit a signal on a user side. The terminal device may also be referred to as a terminal, a UE, a mobile station (MS), a mobile terminal (MT), or the like. The terminal device may be a mobile phone, a tablet computer (Pad), a vehicle-mounted terminal, a high-altitude aircraft, or the like. A specific technology and a specific device form that are used by the terminal device are not limited in this embodiment of this application.

The foregoing content briefly describes the system architecture provided in embodiments of this application, and the following describes possible application scenarios of embodiments of this application.

Figure 2:
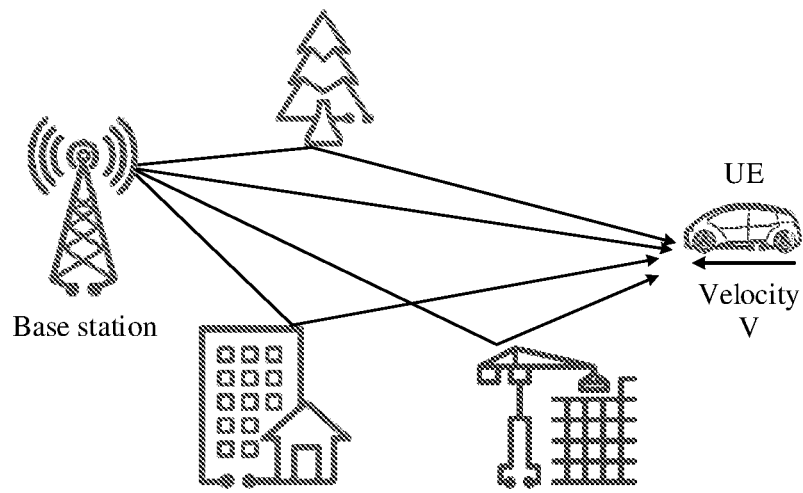
FIG. 2 is a possible schematic diagram of a terrestrial communication scenario according to an embodiment of this application.
Figure 3:
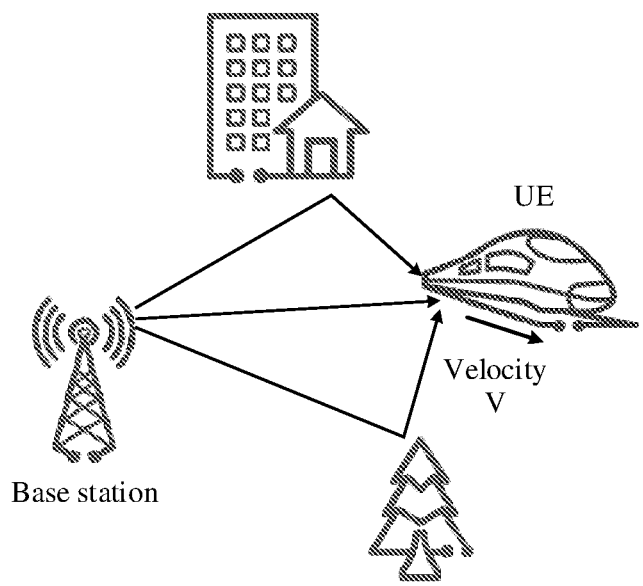
FIG. 3 is another possible schematic diagram of a terrestrial communication scenario according to an embodiment of this application.

The signal processing method provided in embodiments of this application is mainly applied to a scenario in which a high-velocity motion occurs between a receive end and a transmit end. FIG. 2 is a possible schematic diagram of a terrestrial communication scenario according to an embodiment of this application. As shown in FIG. 2, UE is a moving vehicle or the UE is located in the moving vehicle, and the vehicle moves toward a base station at a velocity V. In this scenario, a signal received by a receive end is affected by time-frequency double dispersion. FIG. 3 is another possible schematic diagram of a terrestrial communication scenario according to an embodiment of this application. As shown in FIG. 3, in a high-velocity railway communication scenario, UE is in a high-velocity railway compartment, and a fast relative motion occurs between the UE and a base station. Therefore, in this scenario, a signal received by a receive end is also affected by time-frequency double dispersion.

It may be understood that scenarios shown in FIG. 2 and FIG. 3 are scenarios in a terrestrial communication system, and the signal processing method provided in embodiments of this application may be further applied to a scenario in an NTN communication system. The NTN communication system includes high-altitude platform communication, aircraft communication, satellite communication, and the like. The following uses the satellite communication as an example for description.

5G and an evolved 5G network in the future need to meet service requirements of various industries and need to provide wider service coverage. A limited coverage capability of a current terrestrial mobile communication network cannot meet requirements of people for obtaining information anytime and anywhere. Providing ultra-wide coverage in a mode that is based on base station coverage faces great challenges in terms of costs and feasibility in scenarios such as remote areas, deserts, oceans, and the air.

Compared with a conventional mobile communication system, the satellite communication provides a wider coverage area, and communication costs of the satellite communication are not affected by a transmission distance. Therefore, the satellite communication can overcome natural geographical obstacles such as oceans, deserts, and mountains. In the satellite communication, a velocity of a low earth orbit satellite relative to the ground is 7.6 km/s (km/s), and a severe Doppler shift occurs in a satellite signal received by the UE or a signal received by the satellite. In an initial access phase, even if a pre-compensation or post-compensation frequency offset solution is used, UEs in different positions in a beam are still affected by the Doppler shift to different degrees. For example, when a satellite orbital altitude is 1200 km and a beam diameter is 90 km, and it is assumed that a carrier frequency is 2 GHz, a maximum Doppler shift is not less than 0.91 ppm (parts per million). It is assumed the carrier frequency is 20 GHz, the maximum Doppler shift is not less than 0.4 ppm. The Doppler shift may be represented as Doppler=(v/c)*f, where v represents a relative motion velocity (radial relative motion velocity) between the satellite and the UE, c represents a velocity of light, and f represents the carrier frequency.

Figure 4:
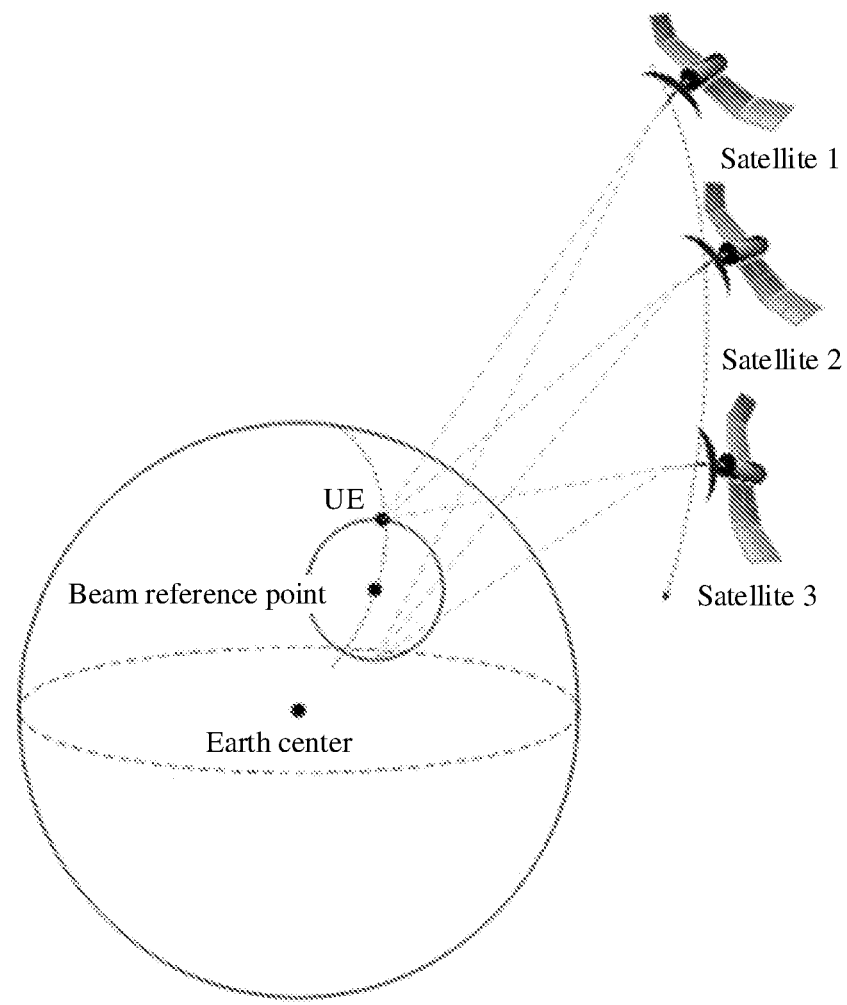
FIG. 4 is a schematic diagram of an application scenario of multi-satellite joint transmission according to an embodiment of this application.

Because a satellite payload is a signal processing platform with limited energy and power, to improve communication rate and communication reliability, a signal with higher receive power and a higher signal-to-noise ratio needs to be provided to the UE in a multi-satellite joint transmission manner. FIG. 4 is a schematic diagram of an application scenario of multi-satellite joint transmission according to an embodiment of this application. As shown in FIG. 4, a satellite 1, a satellite 2, and a satellite 3 simultaneously send a same signal to UE, and the UE obtains an energy gain by receiving signals from a plurality of satellites, to improve decoding performance. However, because relative motion velocities between the satellite 1, the satellite 2, and the satellite 3 and the UE are different, Doppler shifts generated when the signals sent by the three satellites arrive at the UE are also different. Therefore, when the UE receives the signals sent by the three satellites, frequency dispersion effect occurs. In addition, because distances between the three satellites and the UE are also different, delay spread (namely, time dispersion) effect occurs when the signals sent by the three satellites reach the UE. Therefore, it can be seen that in the multi-satellite joint transmission scenario, impact of time-frequency double dispersion also exists.

In embodiments of this application, simulation is used to simulate performance of an orthogonal frequency division multiplexing (OFDM) technology in a scenario in which high-velocity movement occurs at a receive end and a transmit end. In other words, in embodiments of this application, impact of time-frequency double dispersion interference on the OFDM technology is simulated through simulation.

Figure 5:
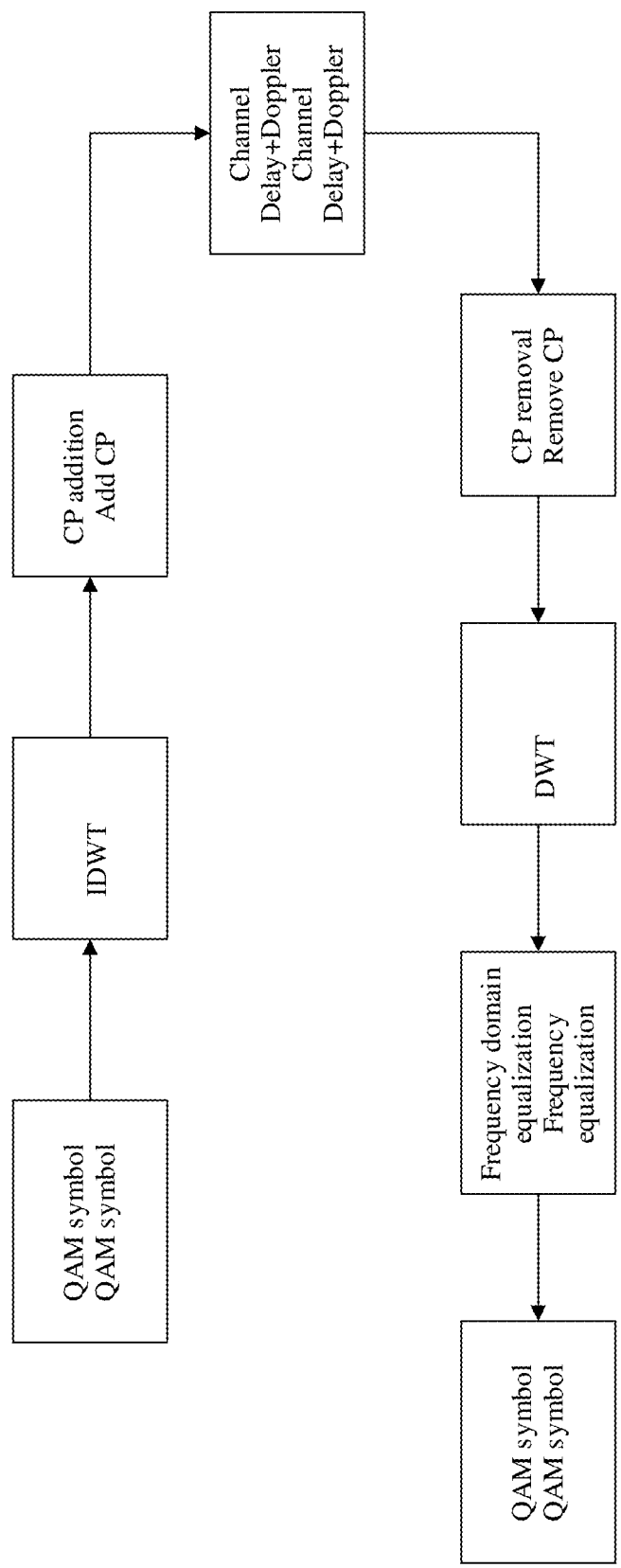
FIG. 5 is a block diagram of an OFDM system according to an embodiment of this application.

FIG. 5 is a block diagram of an OFDM system according to an embodiment of this application. It may be understood that modules such as channel coding and channel estimation are omitted in the OFDM system shown in FIG. 5. As shown in FIG. 5, at an OFDM transmit end, after inverse discrete wavelet transform (IDWT) is performed on a quadrature amplitude modulation (QAM) symbol to transform to time domain, a cyclic prefix (CP) is added before transmission. The transmitted signal is transmitted to a receive end of the OFDM system through a channel with multipath and Doppler. Correspondingly, the OFDM receive end performs discrete wavelet transform (DWT) on the received signal to transform to frequency domain, performs frequency domain equalization, and decodes data after frequency domain equalization.

Figure 6:
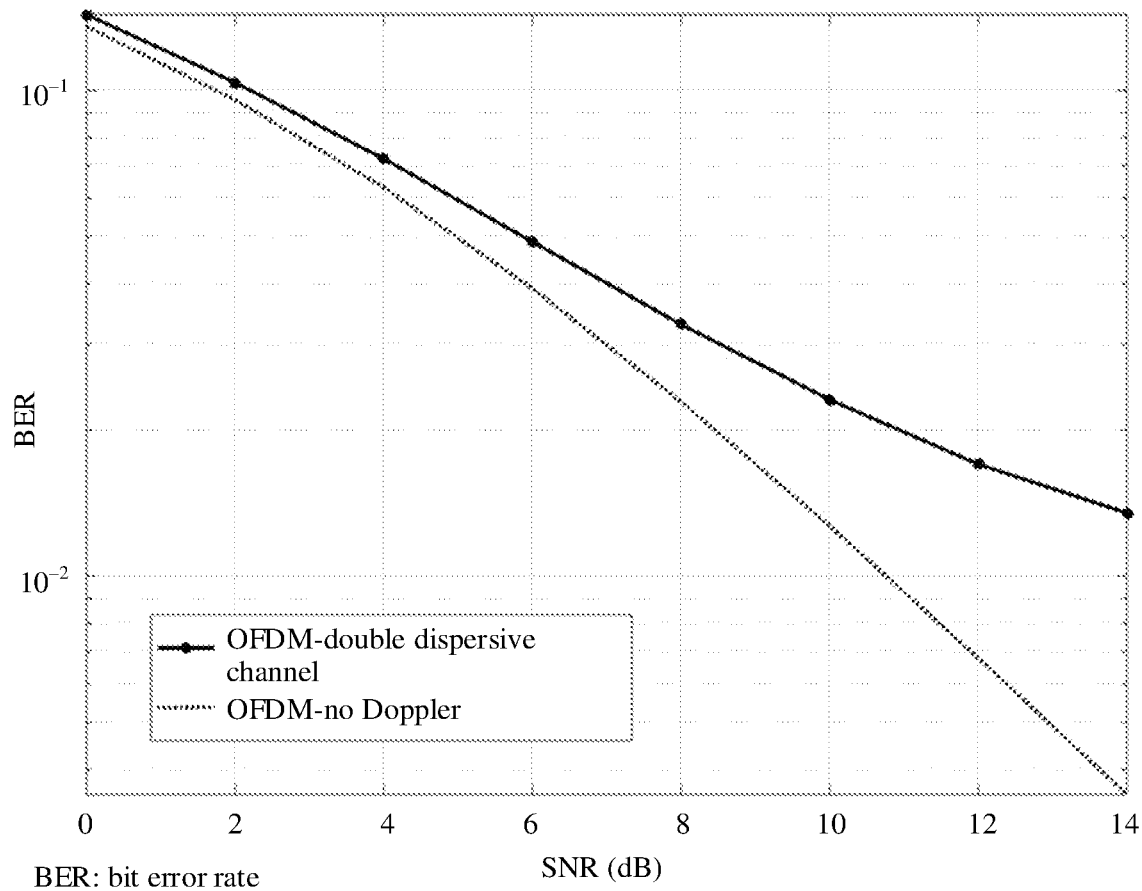
FIG. 6 is a schematic diagram of comparison of bit error rates of an OFDM system on different channels according to an embodiment of this application.

FIG. 6 is a schematic diagram of comparison of bit error rates of an OFDM system on different channels according to an embodiment of this application. As shown in FIG. 6, comparison of bit error rate (BER) performance of an OFDM system on a time-frequency double dispersive channel and a time dispersive channel is shown. In FIG. 6, an OFDM-double dispersive channel (OFDM-double dispersive channel) refers to performance of the OFDM system on the time-frequency double dispersive channel. OFDM-no Doppler (OFDM-no Doppler) in FIG. 6 refers to performance of the OFDM system in the time dispersive channel. Simulation conditions in FIG. 6 are that a symbol length is 512; constellation mapping is quadrature phase shift keying (QPSK); a Doppler tap=[0.0180 0.009 0.008 0]*SCS; delay taps (delay taps)=[0 5 11 17]; channel coefficient=[1 sqrt (0.5) sqrt (0.25) sqrt (0.15)]; a carrier frequency f is 2 GHz, and a subcarrier spacing (SCS) is 15 kHz. sqrt (x) represents a square root of a non-negative real number. For example, sqrt (0.5) is $\sqrt{0.5}$. It can be learned from a simulation result in FIG. 6 that a Doppler spread of the signal greatly affects the BER performance of the OFDM system, and the performance deteriorates greatly. That is, when the OFDM system is in a scenario in which high-velocity movement occurs at a receive end and a transmit end or when time-frequency double dispersion exists in an OFDM signal, the BER performance of the OFDM system severely deteriorates.

Therefore, embodiments of this application provide a signal processing method, to reduce impact of time-frequency double dispersion on a receive end in a scenario in which high-velocity movement occurs at the receive end and a transmit end, and improve decoding performance of the receive end and communication reliability.

Before the signal processing method provided in this application is described, to facilitate understanding of the signal processing method provided in this application, inverse discrete wavelet transform (IDWT) and discrete wavelet transform (DWT) in the signal processing method provided in embodiments of this application are first briefly described.

1. Discrete Wavelet Transform (DWT)

Figure 7A:
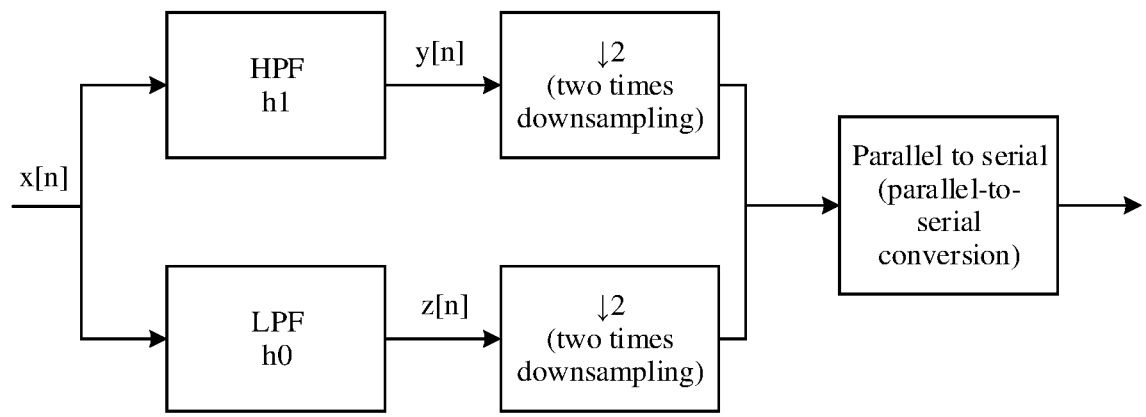
FIG. 7A is a schematic block diagram of single-level DWT according to an embodiment of this application.

FIG. 7A is a schematic block diagram of single-level DWT according to an embodiment of this application. As shown in FIG. 7A, it is assumed that a signal x[n] is input, a filter coefficient of a high pass filter (HPF) is h1, and a filter coefficient of a low pass filter (LPF) is h0. A signal output by the HPF is y[n]=x[n]⊗h1, and ⊗ indicates cyclic convolution. Similarly, a signal output by the LPF is z[n]=x[n]⊗h0. Then, downsampling processing is performed on y[n] and z[n] (two times downsampling in FIG. 7A), then parallel-to-serial (parallel-to-serial) conversion is performed on y[n] and z[n], and then y[n] and z[n] are output.

Figure 7B:
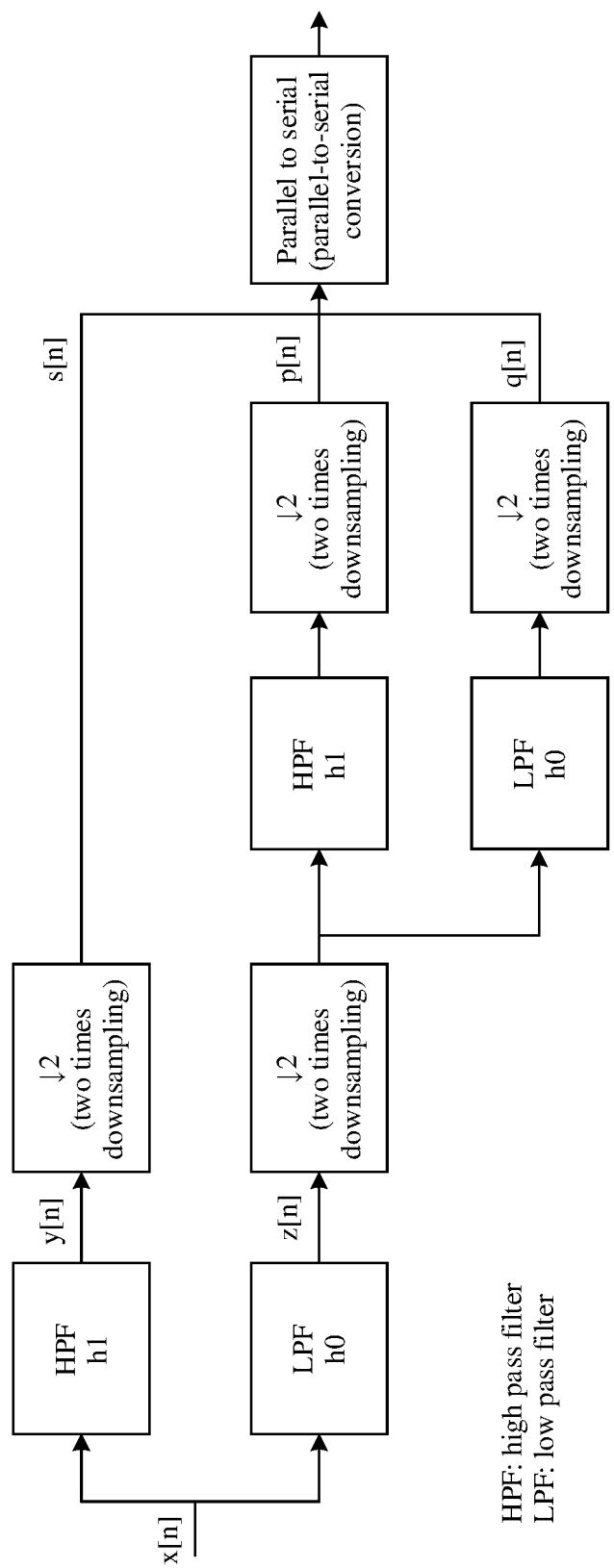
FIG. 7B is a schematic block diagram of two-level DWT according to an embodiment of this application.

FIG. 7B is a schematic block diagram of two-level DWT according to an embodiment of this application. As shown in FIG. 7B, first-level DWT data processing means performing HPF and LPF filtering on a signal, and second-level DWT data processing means performing further DWT processing on the signal output by the LPF in the first-level DWT data processing. The first-level DWT data processing and the second-level DWT data processing constitute two-level DWT signal processing. Similarly, more levels of DWT signal processing may be implemented by performing the HPF and LPF filtering on the signal output by the LPF. As shown in FIG. 7B, DWT of a specific level is used as an example. It is assumed that a signal x[n] is input, a filter coefficient of a high pass filter (HPF) is h1, and a filter coefficient of a low pass filter (LPF) is h0. A signal output by the high pass filter is y[n]=x[n]⊗h1. Similarly, a signal output by the low pass filter is z[n]=x[n]⊗h0. Then, after downsampling processing is performed on y[n] and z[n] (two times downsampling is shown in FIG. 7B), a downsampling signal output by the low pass filter enters next-level DWT. Similarly, multi-level DWT means performing HPF and LPF filtering and downsampling data processing on signals. Finally, parallel-to-serial conversion is performed on the signals output by the multi-level DWT, and then the signals are output.

2. Inverse Discrete Wavelet Transform (IDWT)

Figure 8A:
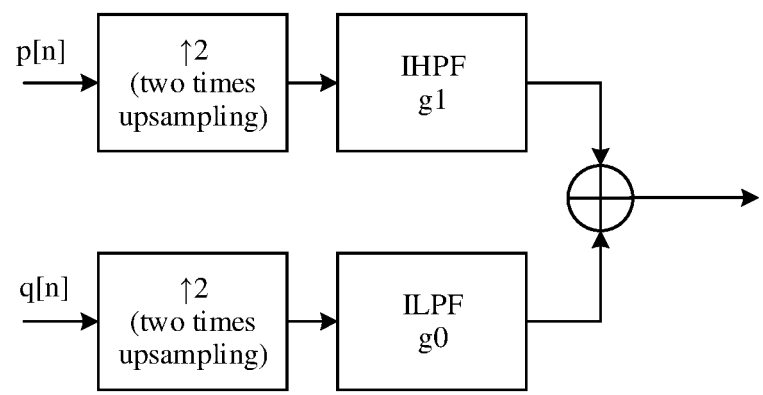
FIG. 8A is a schematic block diagram of single-level IDWT according to an embodiment of this application.

FIG. 8A is a schematic block diagram of single-level IDWT according to an embodiment of this application. As shown in FIG. 8A, upsampling is first performed on input signals p[n] and q[n] (two times upsampling in FIG. 8A). Then, the signals are cyclically convolved by using an IHPF (a filter coefficient of the IHPF is g1) and an ILPF (a filter coefficient of the ILPF is g0) respectively and are added, to obtain synthetic data, and the synthetic data is output.

Figure 8B:
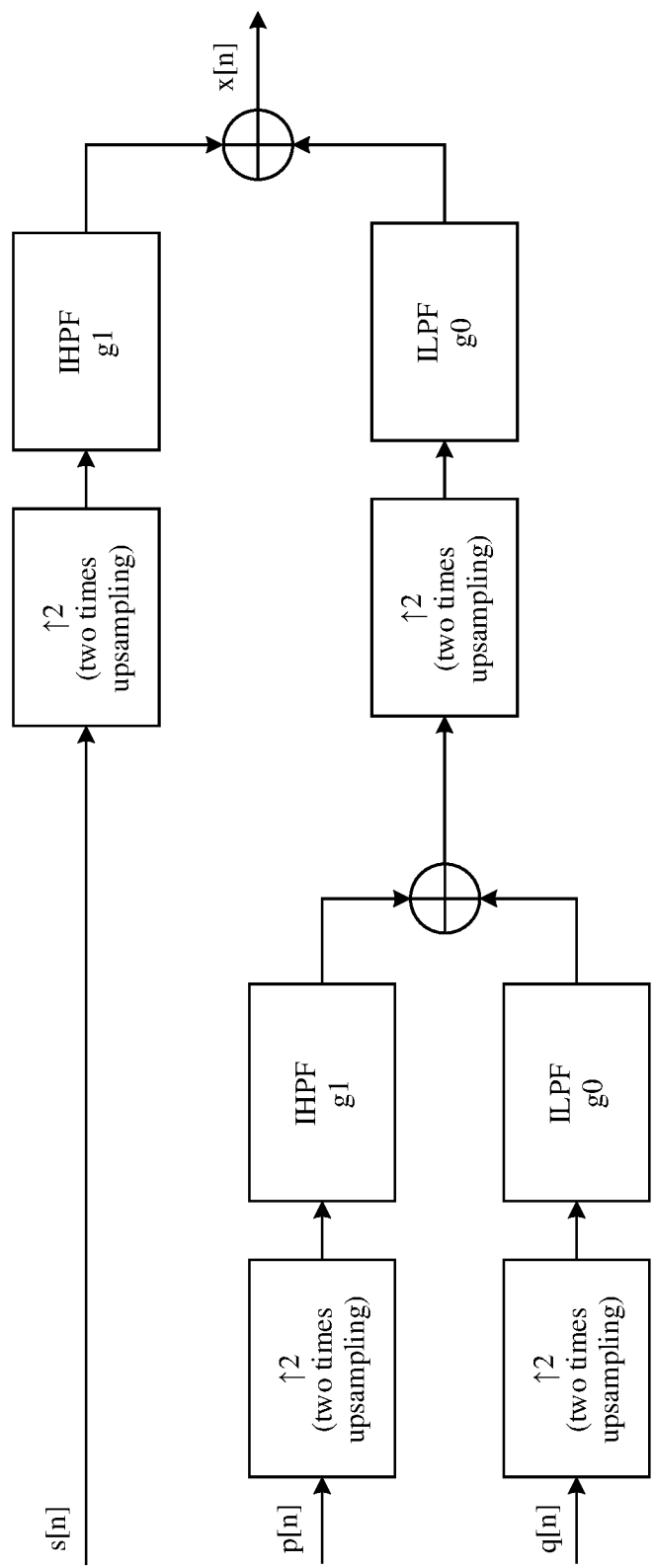
FIG. 8B is a schematic block diagram of two-level IDWT according to an embodiment of this application.

FIG. 8B is a schematic block diagram of two-level IDWT according to an embodiment of this application. As shown in FIG. 8B, first-level IDWT data processing means performing upsampling, inverse high pass filter (IHPF), and inverse low pass filter (LPF) filtering on signals, and second-level DWT data processing means performing further IDWT processing on the signals output by the first-level IDWT data processing. The first-level IDWT data processing and the second-level IDWT data processing constitute two-level IDWT signal processing. Similarly, more levels of IDWT signal processing may be implemented by synthesizing signals output by IDWT of an upper level into a new signal after upsampling and ILPF processing. As shown in FIG. 8B, IDWT of a specific level is used as an example. Upsampling is first performed on signals p[n] and q[n] (two times upsampling in FIG. 8B). Then, the signals are cyclically convolved by using an IHPF (a filter coefficient of the IHPF is g1) and an ILPF (a filter coefficient of the ILPF is g0) respectively and are added, to obtain synthetic data, and the synthetic data enters next-level IDWT.

The following describes in detail the signal processing method provided in this application with reference to more accompanying drawings.

The technical solutions provided in this application are described by using two embodiments. In Embodiment 1, inverse discrete wavelet transform (IDWT) is performed on signals at a transmit end, signals obtained through the IDWT forms a column of a signal matrix, then a transpose operation is performed on the signal matrix, and the signals are sent in an order of columns of the signal matrix. At a receive end, received signals are formed into a corresponding signal matrix, the signal matrix is transposed, then discrete wavelet transform (DWT) is performed on each transposed column, and finally decoding is performed. A difference between Embodiment 2 and Embodiment 1 lies in that, at the transmit end, the signals of the transmit end are processed by using the DWT; and at the receive end, the IDWT is used to process each transposed column. Embodiment 1 and Embodiment 2 are separately described in detail below.

A communication device may be a party that sends a signal, or may be a party that receives a signal. Therefore, for ease of description, the following describes from a perspective of a transmit end and a receive end. It may be understood that in this application, a device that sends a signal is collectively referred to as the transmit end, and a device that receives a signal is collectively referred to as the receive end. In an example, the transmit end may be the base station in the scenario shown in FIG. 2, and correspondingly, the receive end is the UE in the scenario shown in FIG. 2. Similarly, that is, the transmit end is the UE in the scenario shown in FIG. 2, and the receive end is the base station in the scenario shown in FIG. 2. In another example, the transmit end may be the satellite in the scenario shown in FIG. 4, and correspondingly, the receive end is the UE in the scenario shown in FIG. 4.

Embodiment 1

In Embodiment 1 of this application, a signal is processed at a transmit end by using IDWT and a transpose operation, and a corresponding transpose operation and DWT are used at a receive end to process a received signal, so that Doppler impact on the signal sent by the transmit end on a radio channel is averaged or randomized, and a signal on each carrier can be more evenly affected during decoding at the receive end. Therefore, decoding performance of the receive end and communication reliability are improved.

Figure 9:
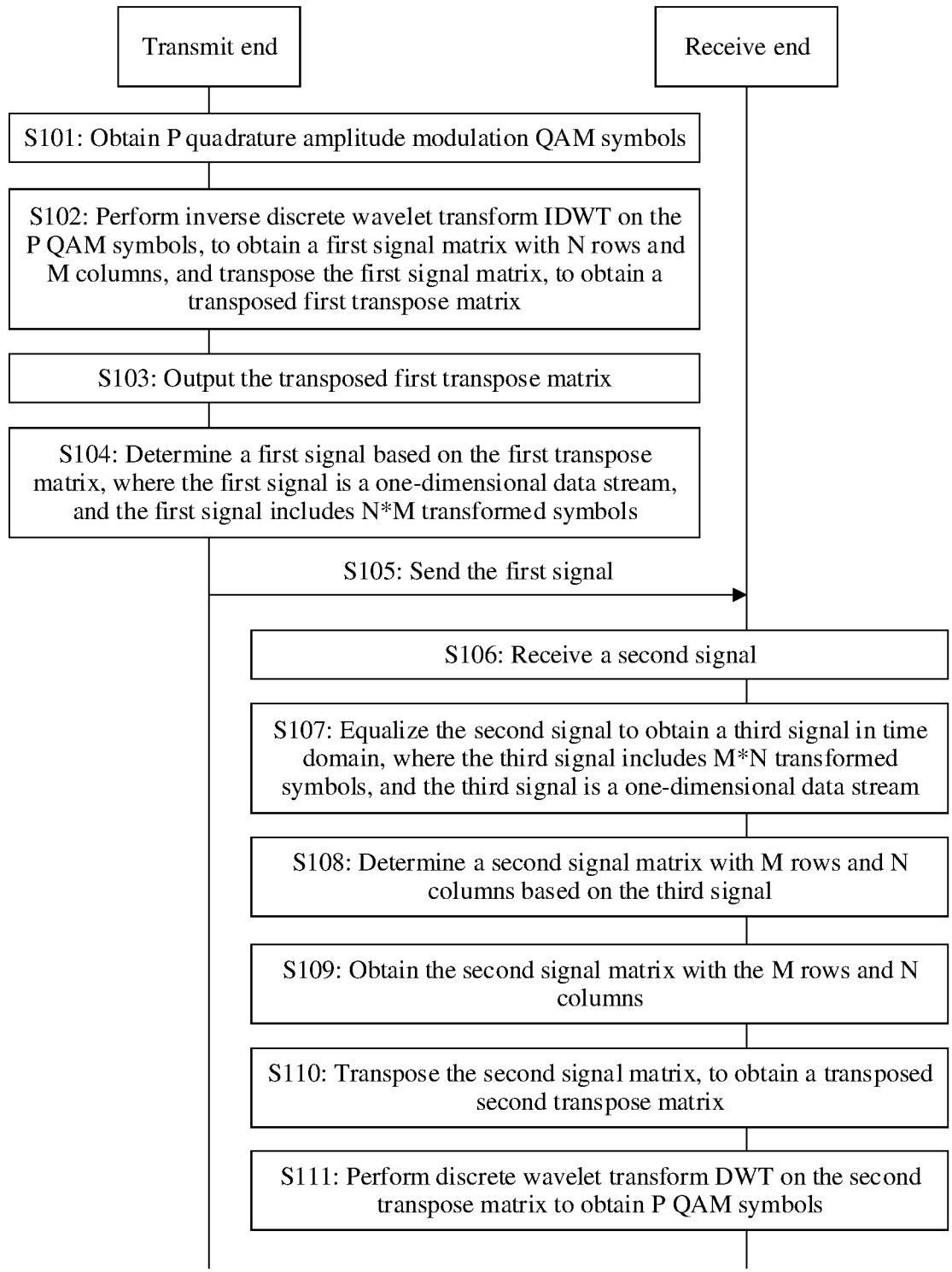
FIG. 9 is a schematic flowchart of a signal processing method according to an embodiment of this application.

FIG. 9 is a schematic flowchart of a signal processing method according to an embodiment of this application. As shown in FIG. 9, the signal processing method includes but is not limited to the following steps.

S101: A transmit end obtains P quadrature amplitude modulation QAM symbols.

Specifically, the transmit end performs QAM mapping on an input original data stream, to obtain the P QAM symbols. The transmit end may obtain the P QAM symbols or receive the P input QAM symbols. P is a positive integer greater than 1.

S102: The transmit end performs inverse discrete wavelet transform IDWT on the P QAM symbols, to obtain a first signal matrix with N rows and M columns, and transposes the first signal matrix, to obtain a transposed first transpose matrix.

Both N and M are positive integers greater than or equal to 1, N and M cannot be both 1, and a value of N multiplied by M is less than or equal to P. One column of the first signal matrix is obtained by performing the IDWT on N QAM symbols in the P QAM symbols; or one row of the first signal matrix is obtained by performing the IDWT on M QAM symbols in the P QAM symbols.

Specifically, the transmit end equally divides the P QAM symbols based on a preset quantity, to obtain a plurality of groups of QAM symbols. In an implementation, if the preset quantity is equal to N, a total of M groups of QAM symbols may be obtained. After performing the IDWT on each group of QAM symbols, the transmit end obtains N elements, and uses the N elements as one column of the matrix. Therefore, after performing the IDWT on each of the M groups of QAM symbols, the transmit end may form the matrix with N rows and M columns, that is, the first signal matrix. The transmit end may perform a transpose (Transpose) operation on the first signal matrix, to obtain the transposed first transpose matrix. It may be understood that the first transpose matrix has M rows and N columns.

Figure 10A:
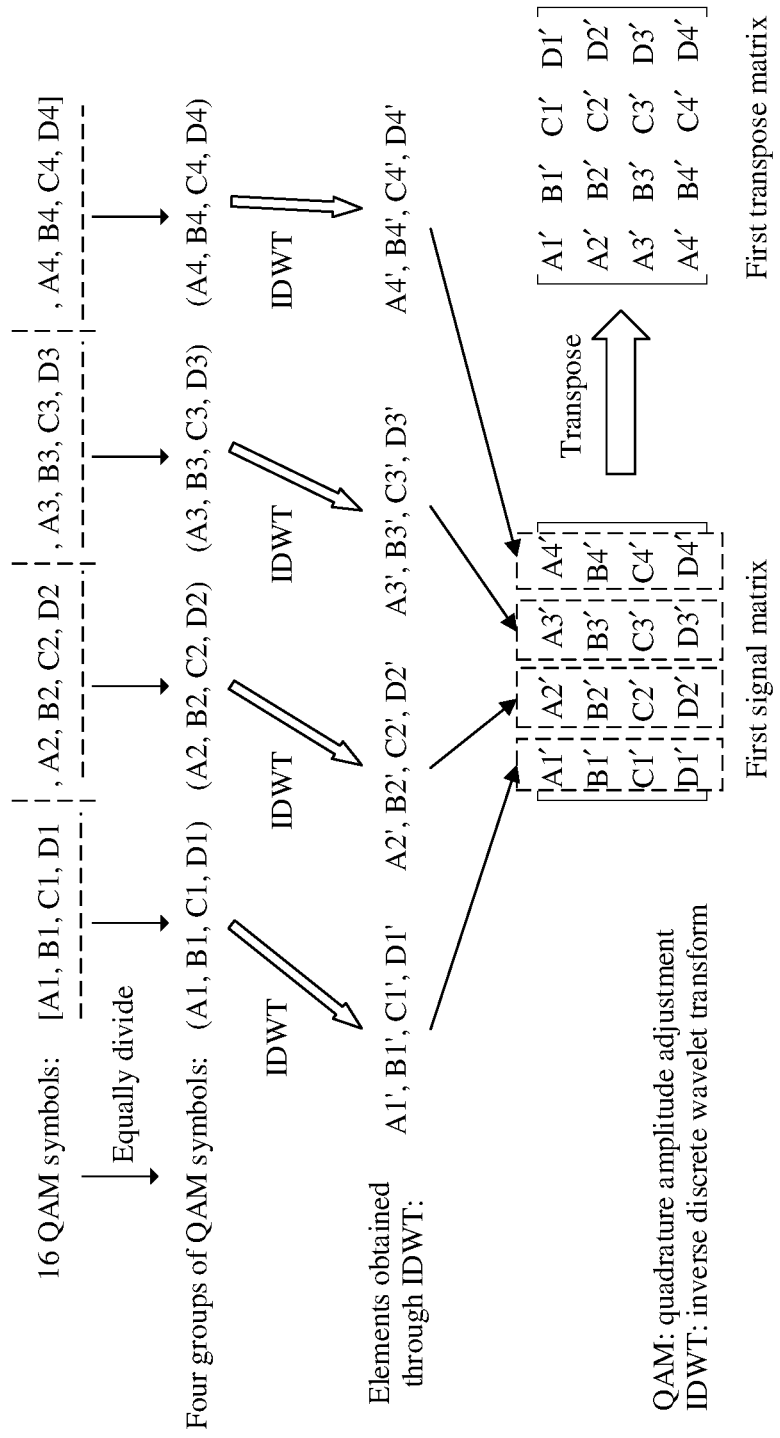
FIG. 10A is a first schematic diagram of generating a first signal matrix and a first transpose matrix according to an embodiment of this application.

For example, P is equal to 16, and the preset quantity is 4 (that is, N is equal to 4). FIG. 10A is a first schematic diagram of generating a first signal matrix and a first transpose matrix according to an embodiment of this application. As shown in FIG. 10A, 16 QAM symbols are represented as [A1, B1, C1, D1, A2, B2, C2, D2, A3, B3, C3, D3, A4, B4, C4, D4] by using a one-dimensional vector. The transmit end equally divides the 16 QAM symbols based on the preset quantity (that is, 4) to obtain four groups of QAM symbols (M is equal to 4): (A1, B1, C1, D1), (A2, B2, C2, D2), (A3, B3, C3, D3), and (A4, B4, C4, D4). After performing the IDWT on a first group of QAM symbols (that is, A1, B1, C1, D1), the transmit end obtains four elements A1', B1', C1', and D1', and uses the four elements (that is, A1', B1', C1', D1') as a first column of a matrix; after performing the IDWT on a second group of QAM symbols (that is, A2, B2, C2, D2), the transmit end obtains four elements A2', B2', C2', and D2', and uses the four elements (that is, A2', B2', C2', D2') as a second column of the matrix; after performing the IDWT on a third group of QAM symbols (that is, A3, B3, C3, D3), the transmit end obtains four elements A3', B3', C3', and D3', and uses the four elements (that is, A3', B3', C3', D3') as a third column of the matrix; and after performing the IDWT on a fourth group of QAM symbols (that is, A4, B4, C4, D4), the transmit end obtains four elements A4', B4', C4', and D4', and uses the four elements (that is, A4', B4', C4', D4') as a fourth column of the matrix. Therefore, a first signal matrix with four rows and four columns is formed, as shown in FIG. 10A. The transmit end performs a transpose operation on the first signal matrix, to obtain a transposed first transpose matrix, as shown in FIG. 10A. It may be understood that the transmit end may perform serial processing or parallel processing when performing the IDWT on the M groups of QAM symbols.

Figure 10B:
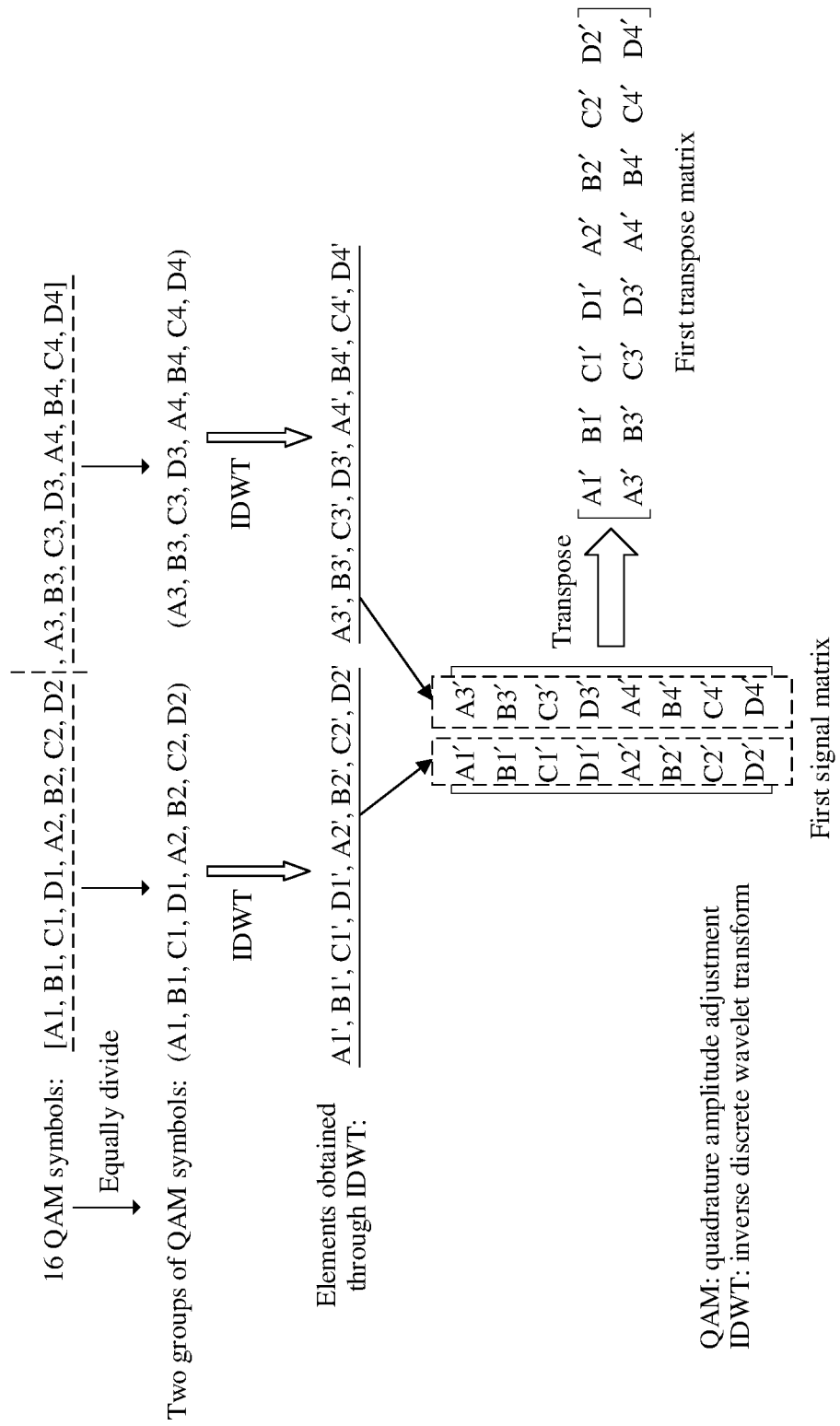
FIG. 10B is a second schematic diagram of generating a first signal matrix and a first transpose matrix according to an embodiment of this application.

For another example, P is equal to 16, and the preset quantity is 8 (that is, N is equal to 8). FIG. 10B is a second schematic diagram of generating a first signal matrix and a first transpose matrix according to an embodiment of this application. As shown in FIG. 10B, 16 QAM symbols are represented as [A1, B1, C1, D1, A2, B2, C2, D2, A3, B3, C3, D3, A4, B4, C4, D4] by using a one-dimensional vector. The transmit end equally divides the 16 QAM symbols based on the preset quantity (that is, 8) to obtain two groups of QAM symbols (M is equal to 2): (A1, B1, C1, D1, A2, B2, C2, D2), and (A3, B3, C3, D3, A4, B4, C4, D4). After performing the IDWT on a first group of QAM symbols (that is, A1, B1, C1, D1, A2, B2, C2, D2), the transmit end obtains eight elements A1', B1', C1', D1', A2', B2', C2', and D2', and uses the eight elements (that is, A1', B1', C1', D1', A2', B2', C2', D2') as a first column of a matrix; and after performing the IDWT on a second group of QAM symbols (that is, A3, B3, C3, D3, A4, B4, C4, D4), the transmit end obtains eight elements A3', B3', C3', D3', A4', B4', C4', and D4', and uses the eight elements (that is, A3', B3', C3', D3', A4', B4', C4', D4') as a second column of the matrix. Therefore, a first signal matrix with eight rows and two columns is formed, as shown in FIG. 10B. The transmit end performs a transpose operation on the first signal matrix, to obtain a transposed first transpose matrix, as shown in FIG. 10B.

Optionally, if P is not an integer multiple of the preset quantity N, the transmit end may perform a zero padding operation on a group of QAM symbols with less than N elements, so that a quantity of elements in the group of QAM symbols is equal to N. After performing the IDWT on each group of QAM symbols (including the group of QAM symbols obtained after the zero padding), the transmit end obtains N elements, and uses the N elements as one column of the matrix.

Figure 10C:
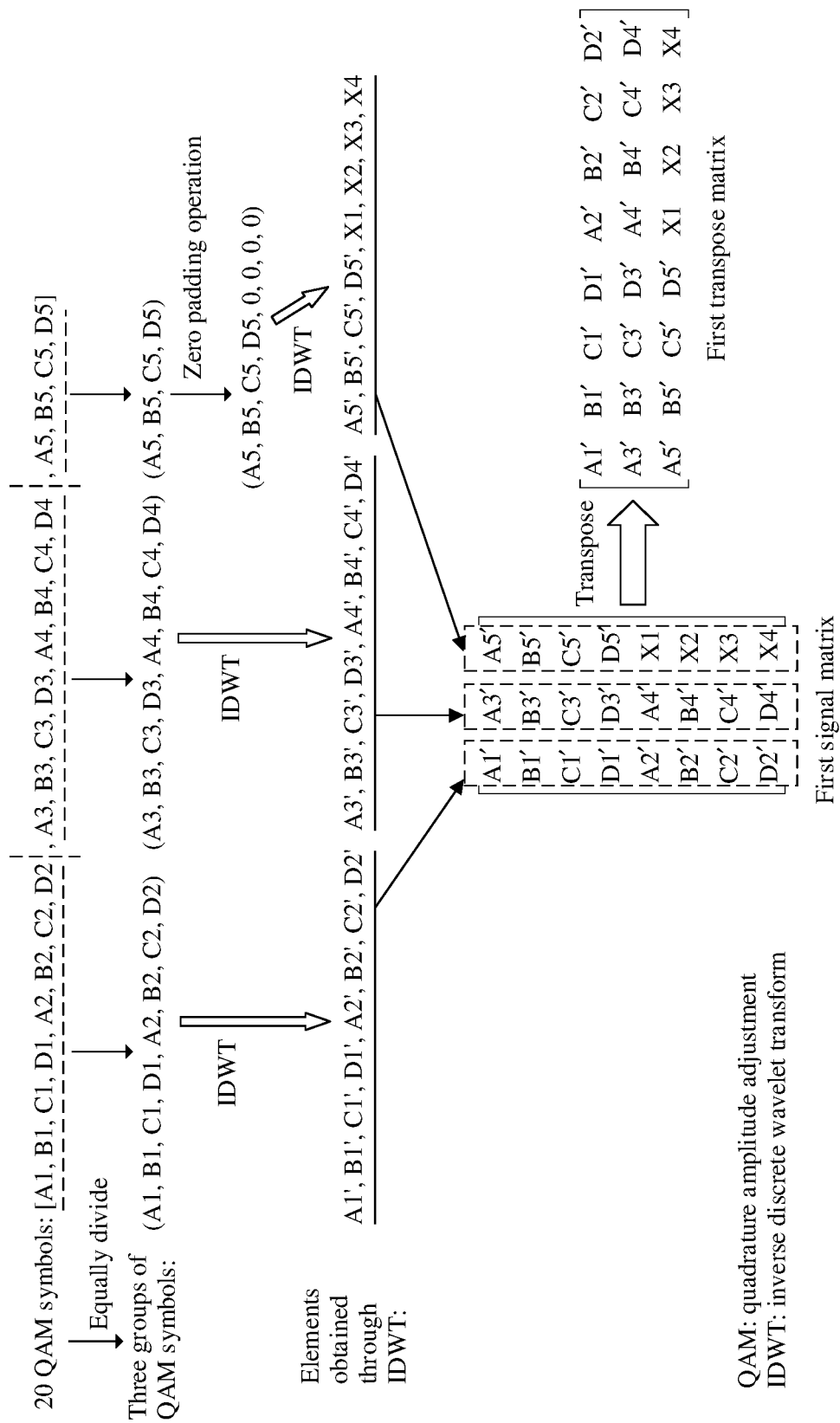
FIG. 10C is a third schematic diagram of generating a first signal matrix and a first transpose matrix according to an embodiment of this application.
Figure 20:
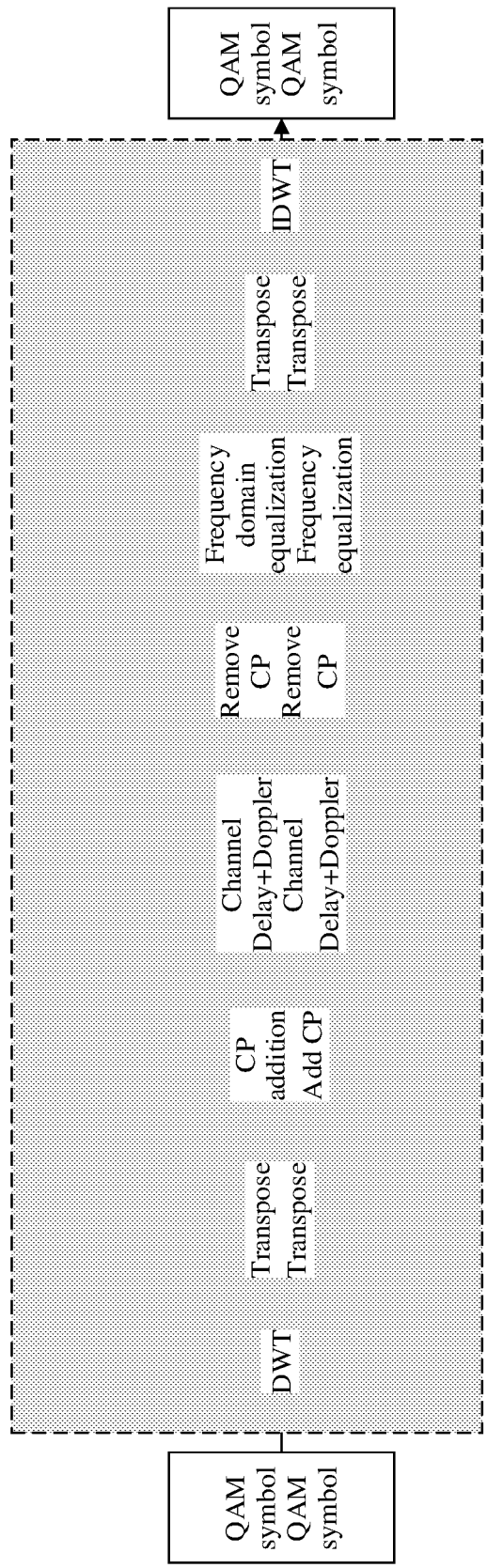
FIG. 20 is still another block diagram of modulation and demodulation according to an embodiment of this application.

For example, P is equal to 20, and the preset quantity is 8 (that is, N is equal to 8). FIG. 10C is a third schematic diagram of generating a first signal matrix and a first transpose matrix according to an embodiment of this application. As shown in FIG. 10C, 20 QAM symbols are represented as [A1, B1, C1, D1, A2, B2, C2, D2, A3, B3, C3, D3, A4, B4, C4, D4, A5, B5, C5, D5] by using a one-dimensional vector. The transmit end may obtain three groups of QAM symbols (M is equal to 3) by equally dividing the 20 QAM symbols based on the preset quantity (that is, 8): (A1, B1, C1, D1, A2, B2, C2, D2), (A3, B3, C3, D3, A4, B4, C4, D4), and (A5, B5, C5, D5). Because P (equal to 20) is not an integer multiple of the preset quantity N (equal to 8), the transmit end performs a zero padding operation on a group of QAM symbols with less than N elements, that is, (A5, B5, C5, D5), to obtain a group of QAM symbols obtained after the zero padding (A5, B5, C5, D5, 0, 0, 0, 0). After performing the IDWT on a first group of QAM symbols (that is, A1, B1, C1, D1, A2, B2, C2, D2), the transmit end obtains eight elements A1', B1', C1', D1', A2', B2', C2', and D2', and uses the eight elements (that is, A1', B1', C1', D1', A2', B2', C2', D2') as a first column of a matrix; after performing the IDWT on a second group of QAM symbols (that is, A3, B3, C3, D3, A4, B4, C4, D4), the transmit end obtains eight elements A3', B3', C3', D3', A4', B4', C4', and D4', and uses the eight elements (that is, A3', B3', C3', D3', A4', B4', C4', D4') as a second column of the matrix; and after performing the IDWT on a third group of QAM symbols (that is, A5, B5, C5, D5, 0, 0, 0, 0), the transmit end obtains eight elements A5', B5', C5', D5', X1, X2, X3, X4), and uses the eight elements (that is, A5', B5', C5', D5', X1, X2, X3, X4) as a third column of the matrix. Therefore, a first signal matrix with eight rows and three columns is formed, as shown in FIG. 10C. The transmit end performs a transpose operation on the first signal matrix, to obtain a transposed first transpose matrix, as shown in FIG. 10C.

In another implementation, if the preset quantity is equal to M, a total of N groups of QAM symbols may be obtained. After performing the IDWT on each group of QAM symbols, the transmit end obtains M elements, and uses the M elements as one row of the matrix. Therefore, after performing the IDWT on each of the N groups of QAM symbols, the transmit end may form the matrix with N rows and M columns, that is, the first signal matrix. The transmit end may perform a transpose operation on the first signal matrix, to obtain the transposed first transpose matrix. It may be understood that the first transpose matrix has M rows and N columns.

Figure 10D:
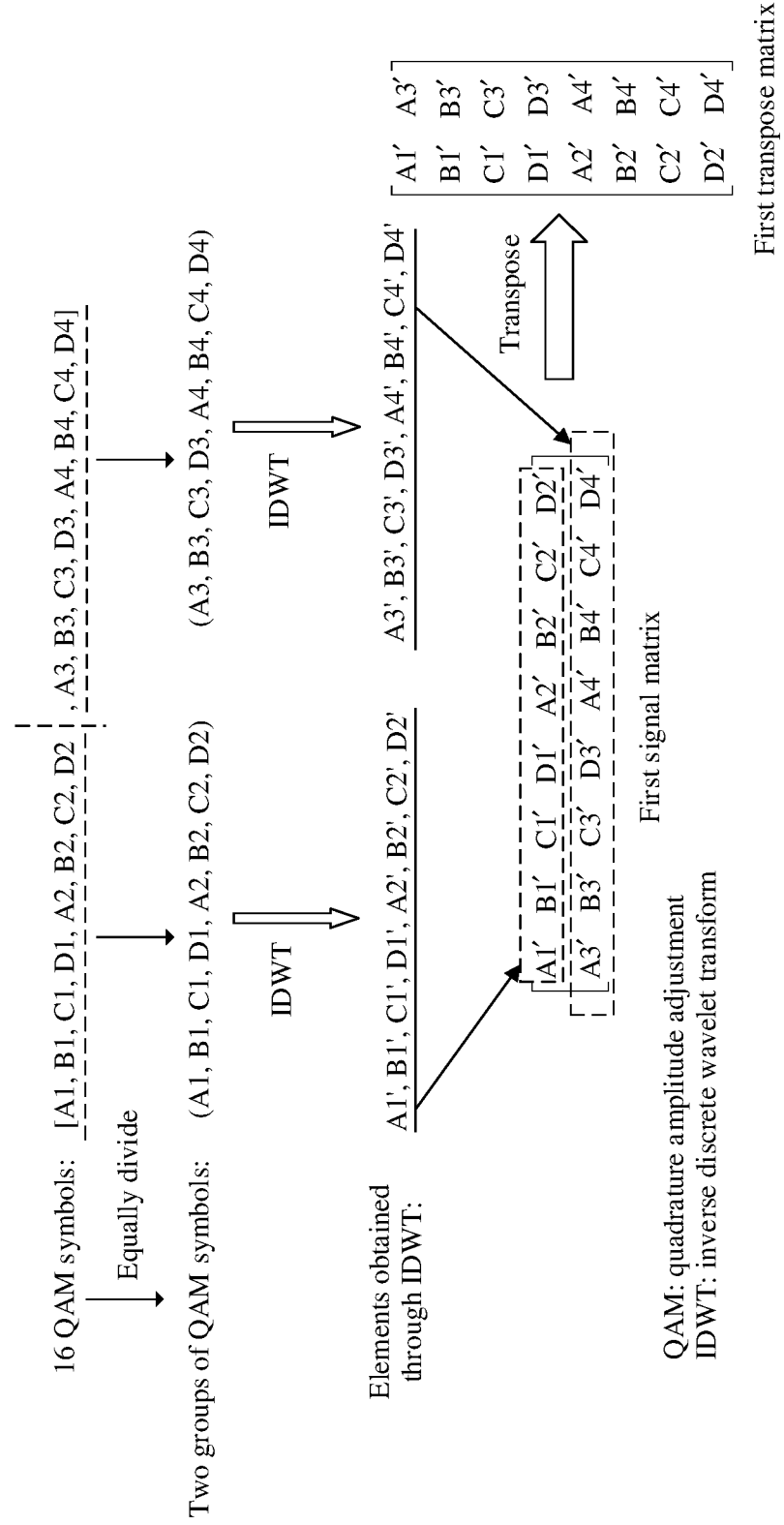
FIG. 10D is a fourth schematic diagram of generating a first signal matrix and a first transpose matrix according to an embodiment of this application.

For example, P is equal to 16, and the preset quantity is 8 (that is, M is equal to 8). FIG. 10D is a fourth schematic diagram of generating a first signal matrix and a first transpose matrix according to an embodiment of this application. As shown in FIG. 10D, 16 QAM symbols are represented as [A1, B1, C1, D1, A2, B2, C2, D2, A3, B3, C3, D3, A4, B4, C4, D4] by using a one-dimensional vector. The transmit end equally divides the 16 QAM symbols based on the preset quantity (that is, 8) to obtain two groups of QAM symbols (N is equal to 2): (A1, B1, C1, D1, A2, B2, C2, D2), and (A3, B3, C3, D3, A4, B4, C4, D4). After performing the IDWT on a first group of QAM symbols (that is, A1, B1, C1, D1, A2, B2, C2, D2), the transmit end obtains eight elements A1', B1', C1', D1', A2', B2', C2', and D2', and uses the eight elements (that is, A1', B1', C1', D1', A2', B2', C2', D2') as a first column of a matrix; and after performing the IDWT on a second group of QAM symbols (that is, A3, B3, C3, D3, A4, B4, C4, D4), the transmit end obtains eight elements A3', B3', C3', D3', A4', B4', C4', and D4', and uses the eight elements (that is, A3', B3', C3', D3', A4', B4', C4', D4') as a second column of the matrix. Therefore, a first signal matrix with two rows and eight columns is formed, as shown in FIG. 10D. The transmit end performs a transpose operation on the first signal matrix, to obtain a transposed first transpose matrix, as shown in FIG. 10D.

Optionally, if P is not an integer multiple of the preset quantity M, the transmit end may perform a zero padding operation on a group of QAM symbols with less than M elements, so that a quantity of elements in the group of QAM symbols is equal to M. After performing the IDWT on each group of QAM symbols (including a group of QAM symbols obtained after the zero padding), the transmit end obtains M elements, and uses the M elements as one row of the matrix.

S103: The transmit end outputs the transposed first transpose matrix.

S104: The transmit end determines a first signal based on the first transpose matrix, where the first signal is a one-dimensional data stream, and the first signal includes N*M transformed symbols.

S105: The transmit end sends the first signal.

The first signal is the one-dimensional data stream, and the first signal includes the N multiplied by M (that is, N*M) transformed symbols. It may be understood that an asterisk (*) in this application indicates a multiplication operation.

Specifically, after obtaining the transposed first transpose matrix, the transmit end may output the first transpose matrix. The transmit end may perform CP addition processing on the first transpose matrix, and output the first signal based on a column of the first transpose matrix, or output the first signal based on a row of the first transpose matrix.

There are two manners of adding the CP. A first manner of adding the CP is as follows: The transmit end uses each column of the first transpose matrix as a symbol (symbol) and adds the CP to the symbol, to obtain M symbols with the CP added, and arranges the M symbols with the CP added into a one-dimensional data stream, to obtain the first signal. Alternatively, the transmit end uses each row of the first transpose matrix as a symbol and adds the CP to the symbol, to obtain N symbols with the CP added, and arranges the N symbols with the CP added into a one-dimensional data stream, to obtain the first signal. The transmit end sends the first signal. For example, the transmit end sends the first signal in a unit of the symbols with the CP added, and sends one symbol each time until the first signal is completely sent (that is, all symbols with the CP added in the first signal are sent). In other words, each column (or each row) of the first transpose matrix is used as a symbol, a CP is added to each symbol, and a plurality of symbols with the CP added form the first signal.

Figure 11A:
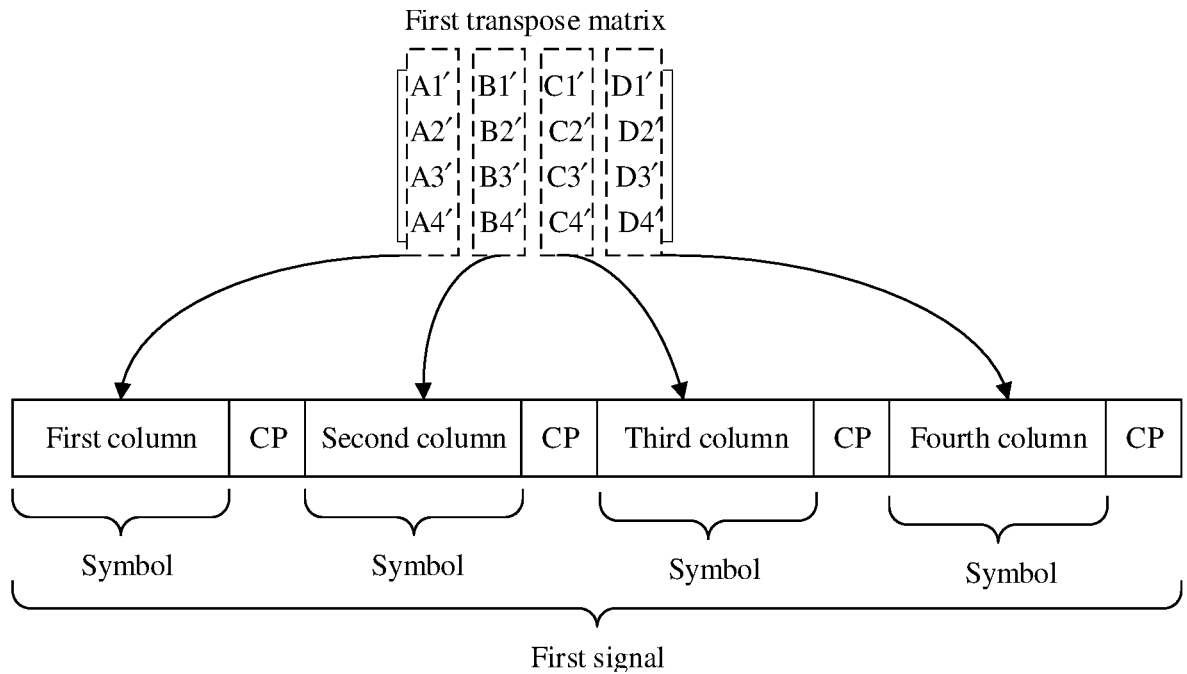
FIG. 11A is a schematic diagram of a first signal according to an embodiment of this application.

For example, the first signal matrix and the first transpose matrix shown in FIG. 10A are used as an example. FIG. 11A is a schematic diagram of a first signal according to an embodiment of this application. As shown in FIG. 11A, a first column of the first transpose matrix is used as a symbol with a CP added, a second column is used as another symbol with a CP added, a third column is used as still another symbol with a CP added, and a fourth column is used as yet another symbol with a CP added, to form a one-dimensional first signal. The CP added to each symbol may be different.

In a second manner of adding the CP, the transmit end forms a signal vector by using a column of the first transpose matrix, and adds the CP to the signal vector as a whole, to obtain the first signal. Alternatively, the transmit end forms a signal vector by using a row of the first transpose matrix, and adds the CP to the signal vector as a whole, to obtain the first signal. The transmit end sends the first signal. In other words, each column (or each row) of the first transpose matrix is used as a symbol, these symbols are sequentially formed a vector, a CP is added to the vector as a whole, and the vector with the CP added forms the first signal.

Figure 11B:
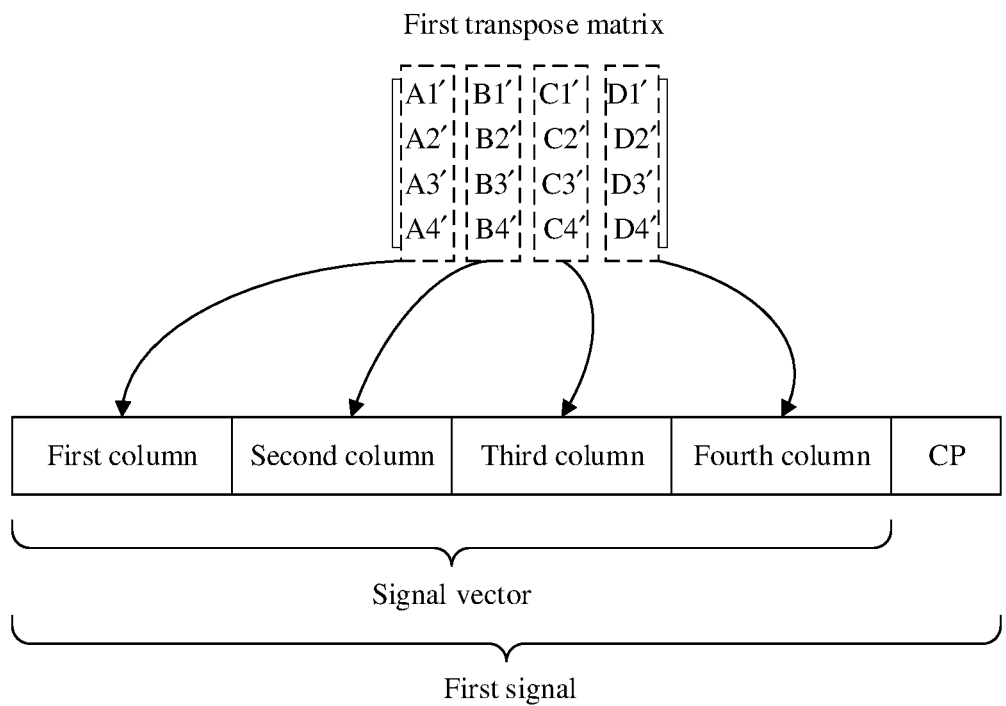
FIG. 11B is another schematic diagram of a first signal according to an embodiment of this application.

For example, the first signal matrix and the first transpose matrix shown in FIG. 10A are used as an example. FIG. 11B is another schematic diagram of a first signal according to an embodiment of this application. As shown in FIG. 11B, the transmit end forms a signal vector by using a column of the first transpose matrix, and adds a CP to the signal vector as a whole, to form a one-dimensional first signal. It may be understood that a sequence in which a first column, a second column, a third column, and a fourth column of the first transpose matrix form the signal vector is not limited in this embodiment of this application. For example, a sequence of forming the signal vector may be the second column, the first column, the fourth column, and the third column.

Optionally, in the foregoing process of generating the first signal matrix, if the first signal matrix is generated in a unit of columns (that is, when the N elements obtained by performing the IDWT on each group of QAM symbols are used as a column of the matrix), the transmit end uses each column of the first transpose matrix as a symbol for CP addition. If in the foregoing process of generating the first signal matrix, the first signal matrix is generated in a unit of rows (that is, when the M elements obtained by performing the IDWT on each group of QAM symbols are used as a row of the matrix), the transmit end uses each row of the first transpose matrix as a symbol to perform CP addition processing. Similarly, in the foregoing process of generating the first signal matrix, if the first signal matrix is generated in a unit of columns (that is, when the N elements obtained by performing the IDWT on each group of QAM symbols are used as a column of the matrix), the transmit end forms the signal vector by using the column of the first transpose matrix. If in the foregoing process of generating the first signal matrix, the first signal matrix is generated in a unit of rows (that is, when the M elements obtained by performing the IDWT on each group of QAM symbols are used as a row of the matrix), the transmit end forms the signal vector by using the row of the first transpose matrix.

S106: A receive end receives a second signal.

It should be understood that after the transmit end sends the first signal, the first signal is transmitted on a radio channel. Double impact of multipath and Doppler exists on the radio channel in this application. Because transmission of the first signal on the radio channel is affected by both multipath and Doppler, the first signal changes. Therefore, to distinguish the signal transmitted by the transmit end from the signal received by the receive end, the signal transmitted to the receive end is denoted as the second signal in this application.

S107: The receive end equalizes the second signal to obtain a third signal in time domain, where the third signal includes M*N transformed symbols, and the third signal is a one-dimensional data stream.

S108: The receive end determines a second signal matrix with M rows and N columns based on the third signal.

Specifically, the receive end may perform equalization after performing CP removal on the received second signal (The equalization herein may be time domain equalization or frequency domain equalization, and if the frequency domain equalization is used, the second signal needs to be transformed to the frequency domain after the CP removal, and then equalization processing is performed. After the equalization processing, the second signal is transformed back to the time domain.), to obtain the third signal in the time domain, where the third signal includes the M*N transformed symbols, and the third signal is the one-dimensional data stream. It should be understood that the M*N transformed symbols included in the third signal herein are symbols after the N*M transformed symbols included in the first signal experienced the double impact of multipath and Doppler (namely, channel impact) and the equalization. Because the third signal is the one-dimensional data stream, the receive end may generate the second signal matrix with the M rows and N columns by using every M symbols in the third signal as one column, or generate the second signal matrix with the M rows and N columns by using every N symbols in the third signal as one row.

Figure 12A:
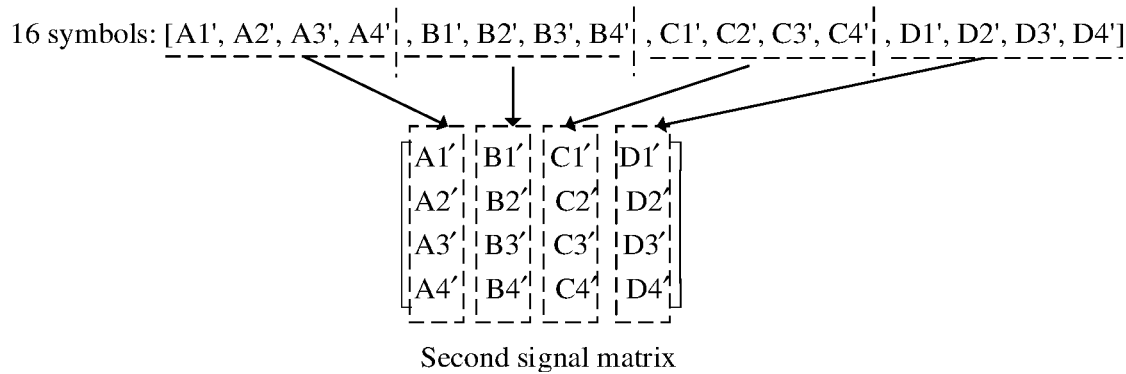
FIG. 12A is a schematic diagram of generating a second signal matrix according to an embodiment of this application.

For example, M is equal to 4, N is equal to 4, and it is assumed that the M*N symbols included in the third signal are [A1', A2', A3', A4', B1', B2', B3', B4', C1'. C2', C3', C4', D1', D2', D3', D4']. FIG. 12A is a schematic diagram of generating a second signal matrix according to an embodiment of this application. As shown in FIG. 12A, the receive end may obtain N columns by using every M symbols in the third signal as one column, to form the second signal matrix with the M rows and N columns. Each symbol in the third signal is not repeatedly used.

Figure 12B:
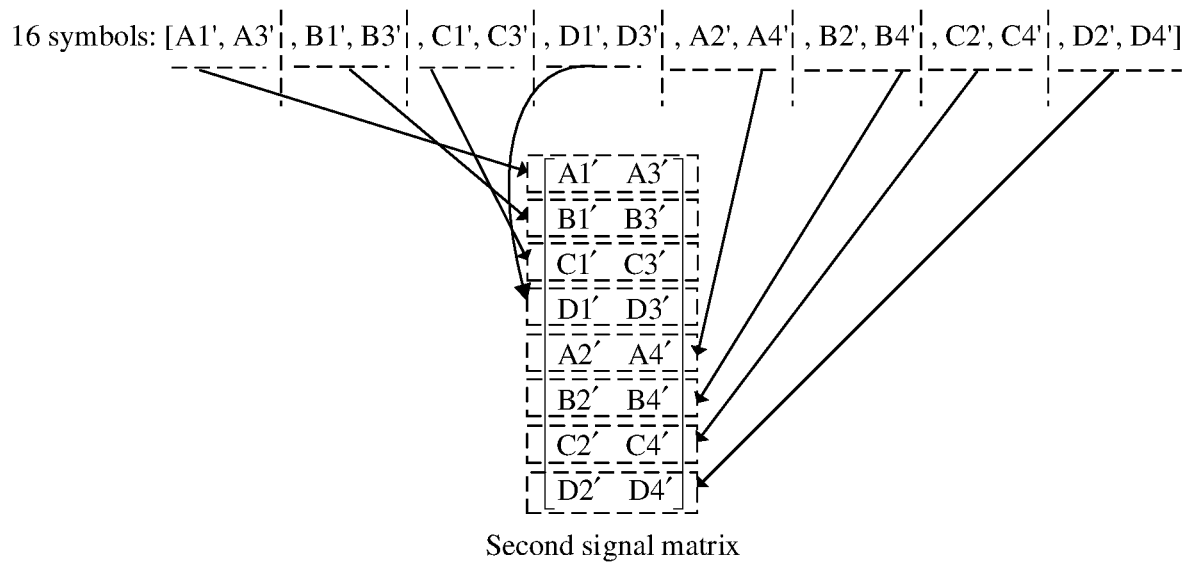
FIG. 12B is another schematic diagram of generating a second signal matrix according to an embodiment of this application.

For example, M is equal to 8, N is equal to 2, and it is assumed that the M*N symbols included in the third signal are [A1', A3', B1', B3', C1', C3', D1', D3', A2'. A4', B2', B4', C2', C4', D2', D4']. FIG. 12B is another schematic diagram of generating a second signal matrix according to an embodiment of this application. As shown in FIG. 12B, the receive end may obtain M rows by using every N symbols in the third signal as one row, to form the second signal matrix with the M rows and N columns.

It may be understood that if the transmit end generates the first signal in the unit of columns (that is, the first signal is output based on the column of the first transpose matrix), the receive end generates the second signal matrix in a unit of columns (in other words, every M symbols in the third signal are used as one column to generate the second signal matrix with the M rows and N columns). If the transmit end generates the first signal in the unit of rows (that is, the first signal is output based on the row of the first transpose matrix), the receive end generates the second signal matrix in a unit of rows (in other words, every N symbols in the third signal are used as one row to generate the second signal matrix with the M rows and N columns).

S109: The receive end obtains the second signal matrix with the M rows and N columns.

S110: The receive end transposes the second signal matrix, to obtain a transposed second transpose matrix.

S111: The receive end performs discrete wavelet transform DWT on the second transpose matrix to obtain P QAM symbols.

Specifically, the receive end may obtain or receive the second signal matrix with the M rows and N columns, and may perform transpose on the second signal matrix, to obtain the transposed second transpose matrix, where the second transpose matrix has N rows and M columns. The receive end may separately perform the DWT on each column of the second transpose matrix, to obtain N QAM symbols, so as to obtain N*M QAM symbols. Alternatively, the receive end separately performs the DWT on each row of the second transpose matrix, to obtain M QAM symbols, so as to obtain N*M QAM symbols. N*M is greater than or equal to P. If N*M is greater than P, the receive end may perform a zero removal operation on the N*M QAM symbols, to obtain the P QAM symbols. For example, N multiplied by M (that is, N*M) is equal to 24, P is equal to 20, and the receive end obtains 24 QAM symbols: [A1, B1, C1, D1, A2, B2, C2, D2, A3, B3, C3, D3, A4, B4, C4, D4, A5, B5, C5, D5, 0, 0, 0, 0]. After the receive end performs the zero removal operation on the 24 QAM symbols, 20 QAM symbols are obtained: [A1, B1, C1, D1, A2, B2, C2, D2, A3, B3, C3, D3, A4, B4, C4, D4, A5, B5, C5, D5].

Figure 13A:
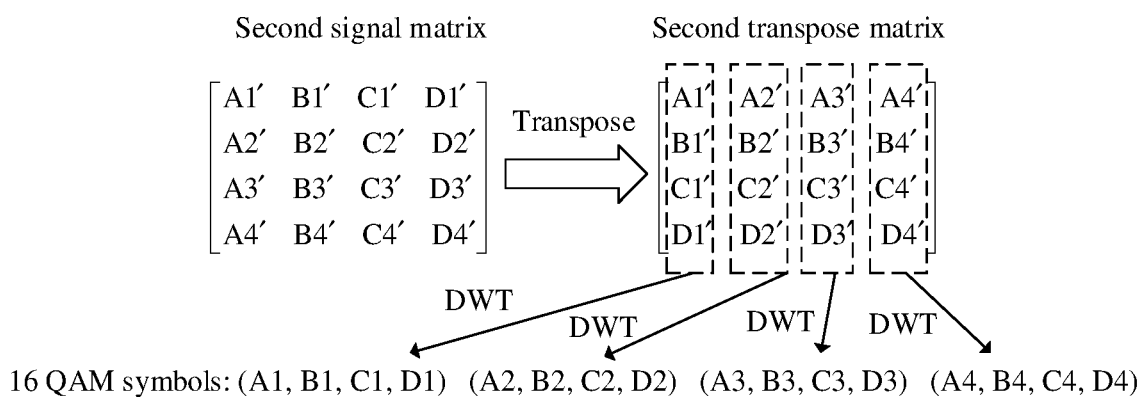
FIG. 13A is a schematic diagram of obtaining QAM symbols by using a second transpose matrix according to an embodiment of this application.

For example, the second signal matrix is shown in FIG. 12A. FIG. 13A is a schematic diagram of obtaining QAM symbols by using a second transpose matrix according to an embodiment of this application. As shown in FIG. 13A, the receive end separately performs the DWT on each column of the second transpose matrix, to obtain 4 QAM symbols, so as to obtain 16 QAM symbols.

Figure 13B:
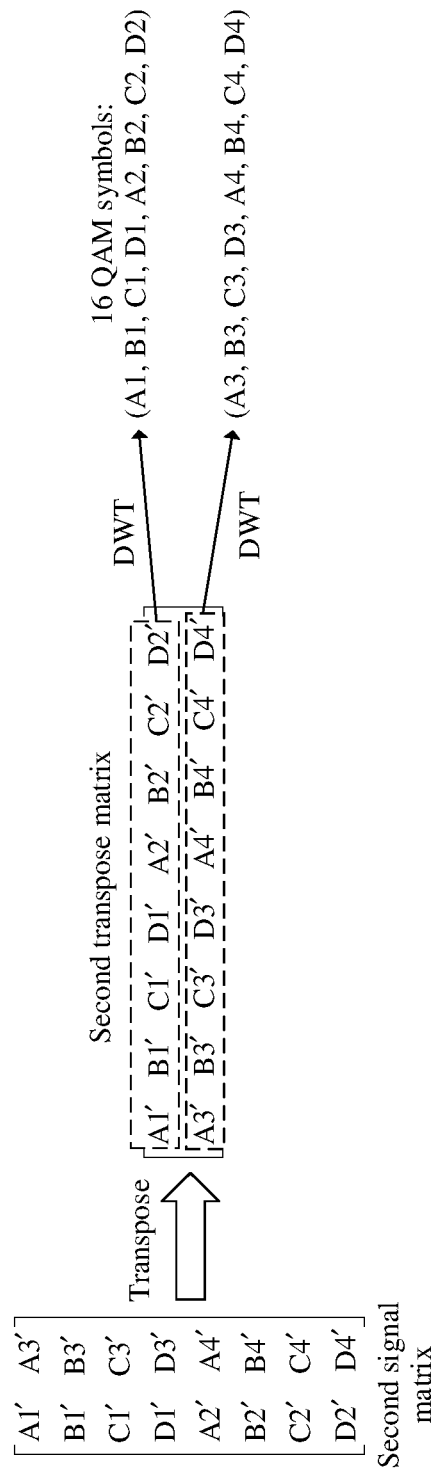
FIG. 13B is another schematic diagram of obtaining QAM symbols by using a second transpose matrix according to an embodiment of this application.

For another example, the second signal matrix is shown in FIG. 12B. FIG. 13B is another schematic diagram of obtaining QAM symbols by using a second transpose matrix according to an embodiment of this application. As shown in FIG. 13B, the receive end separately performs the DWT on each row of the second transpose matrix, to obtain 8 QAM symbols, so as to obtain 16 QAM symbols.

It can be learned that in this embodiment of this application, the signal is processed at the transmit end by using the IDWT and the transpose operation, and the corresponding apparatus operation and DWT are used at the receive end to process the received signal, so that the Doppler impact on the signal sent by the transmit end on the radio channel is averaged or randomized, and the signal on each carrier can be more evenly affected during the decoding at the receive end. Therefore, impact of time-frequency double dispersion on the receive end is reduced, and the decoding performance of the receive end and the communication reliability are improved.

Figure 14A:
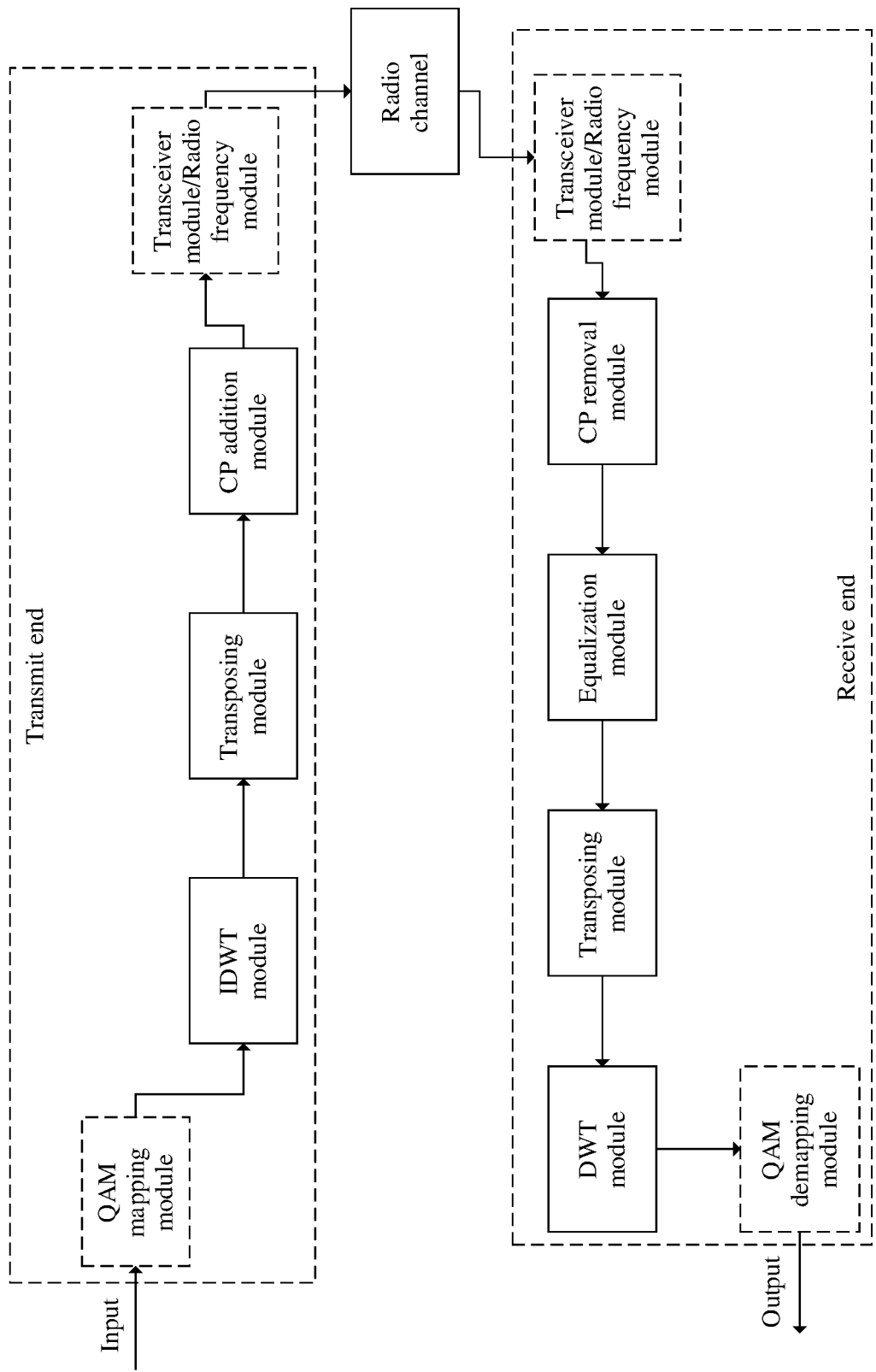
FIG. 14A is a system block diagram of a signal processing method according to an embodiment of this application.

To facilitate understanding of the technical solution in Embodiment 1 of this application, the following describes several possible system block diagrams for implementing the technical solution in Embodiment 1 of this application. FIG. 14A is a system block diagram of a signal processing method according to an embodiment of this application. As shown in FIG. 14A, the system block diagram may include a transmit end, a receive end, and a radio channel. A signal sent by the transmit end is transmitted to the receive end through the radio channel (channel with multipath and Doppler). The transmit end may include an IDWT module, a transposing module, a CP addition module, and the like, and optionally includes a QAM mapping module and a transceiver module (or a radio frequency module). The receive end may include a CP removal module, an equalization module, a transposing module, a DWT module, and the like, and optionally includes a transceiver module (or a radio frequency module) and a QAM demapping module. In an example, the QAM mapping module may be configured to implement the step S101 in FIG. 9, the IDWT module and the transposing module at the transmit end may be configured to implement the step S102 in FIG. 9, the transposing module may be further configured to implement the step S103 in FIG. 9, and the CP addition module and the transceiver module at the transmit end may be configured to implement the step S104 and the step S105 in FIG. 9. The transceiver module at the receive end may be configured to implement the step S106 in FIG. 9, the CP removal module may be configured to perform CP removal processing on the signal obtained in the step S106, the equalization module may be configured to implement the step S107 and the step S108 in FIG. 9, the transposing module at the receive end may be configured to implement the step S110 in FIG. 9, and the DWT module may be configured to perform the step S111 in FIG. 9.

Figure 14B:
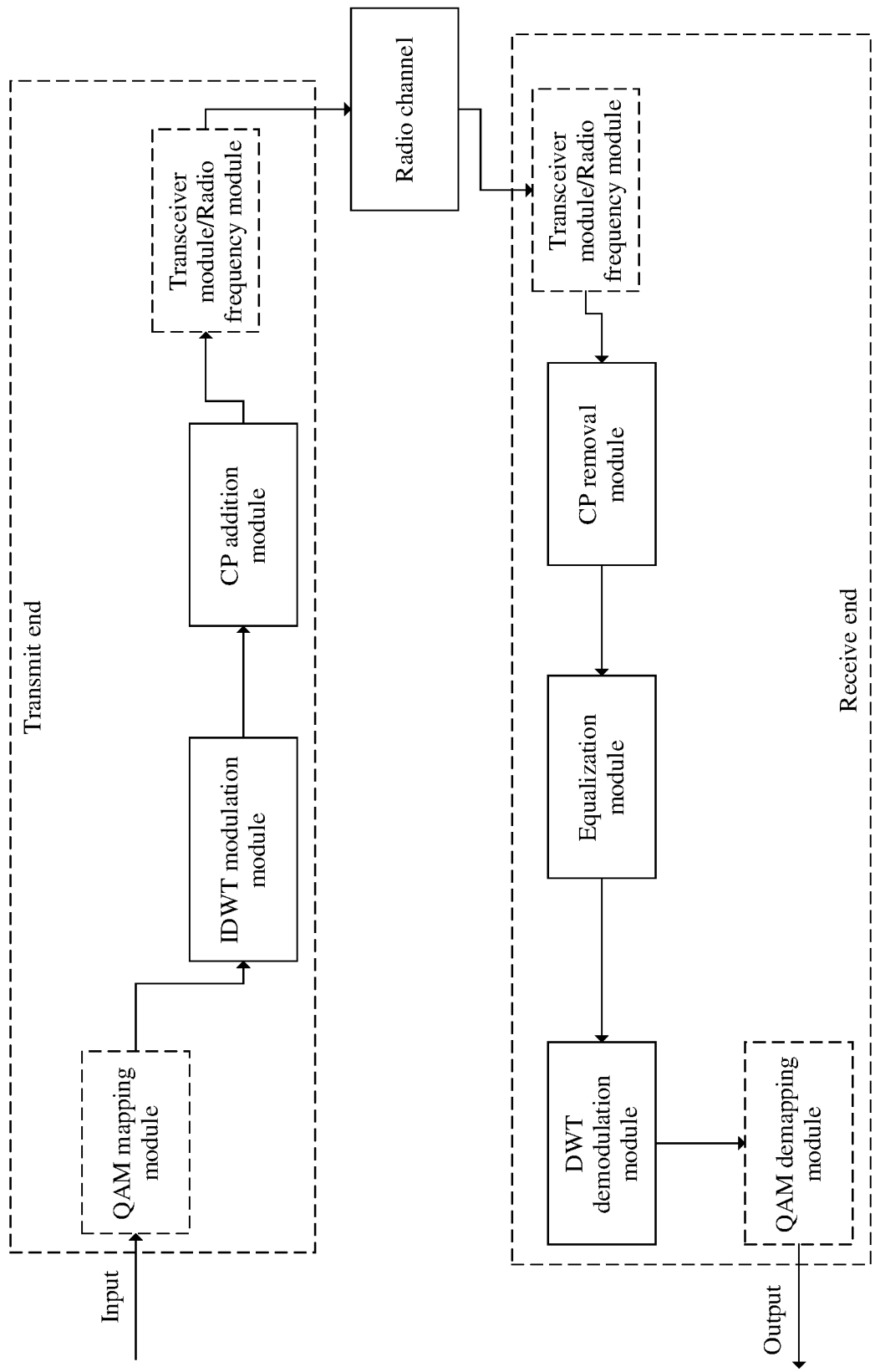
FIG. 14B is another system block diagram of a signal processing method according to an embodiment of this application.

Optionally, the IDWT module and the transposing module at the transmit end may also be integrated into one module, for example, an IDWT modulation module. Correspondingly, the DWT module and the transposing module at the receive end may also be integrated into one module, for example, a DWT demodulation module. FIG. 14B is another system block diagram of a signal processing method according to an embodiment of this application. As shown in FIG. 14B, a transmit end of the system block diagram may include an IDWT modulation module, a CP addition module, and the like, and optionally includes a QAM mapping module and a transceiver module (or a radio frequency module). A receive end of the system block diagram may include a CP removal module, an equalization module, a DWT demodulation module, and the like, and optionally includes a transceiver module (or a radio frequency module) and a QAM demapping module. The IDWT modulation module is configured to implement functions of the IDWT module and the transposing module at the transmit end shown in FIG. 14A, and the DWT demodulation module is configured to implement functions of the DWT module and the transposing module at the receive end shown in FIG. 14A.

It may be understood that the IDWT module, the transposing module, the CP addition module, and the QAM mapping module included in the transmit end in FIG. 14A may be integrated into one module, for example, a baseband processing module. The CP removal module, the equalization module, the transposing module, the DWT module, and the QAM demapping module included in the receive end in FIG. 14A may also be integrated into one module, for example, a baseband processing module. It may be understood that modules such as channel coding and channel estimation are omitted in the system block diagrams shown in FIG. 14A and FIG. 14B.

It may be further understood that, the modules in FIG. 14A or FIG. 14B may be combined to implement the signal processing method provided in Embodiment 1.

Figure 15:
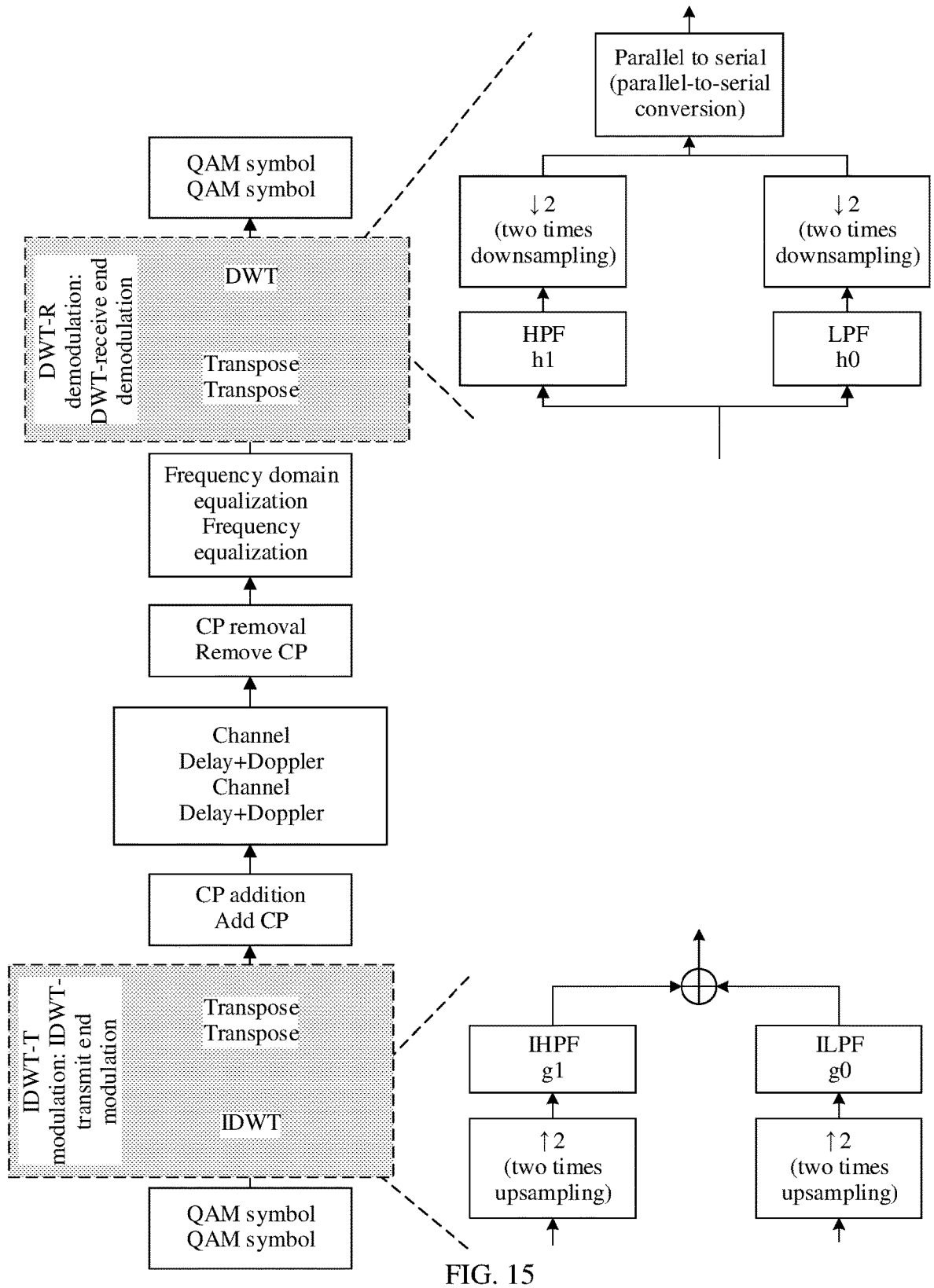
FIG. 15 is a block diagram of modulation and demodulation according to an embodiment of this application.

In an example, FIG. 15 is a block diagram of modulation and demodulation according to an embodiment of this application. As shown in FIG. 15, in the block diagram of modulation and demodulation, single-level IDWT is used at a transmit end, and single-level DWT is used at a receive end. At the transmit end, a plurality of QAM symbols divided into groups are separately processed by a single-level IDWT module, a signal matrix is formed with elements obtained by using each group of QAM symbols that are processed by the IDWT as columns, and then a transpose operation is performed on the signal matrix. Then, a CP is added in a unit of columns of the signal matrix, that is, a column of the signal matrix is used as a symbol and a CP is added to the symbol, to obtain a transmit signal, and then the transmit signal is transmitted. Alternatively, a CP is added in a unit of the signal matrix, that is, a signal vector is formed based on the column of the signal matrix, and a CP is added to the signal vector. In this example, that the CP is added in the unit of the columns is used for description. At the receive end, a signal affected by a multipath delay, Doppler impact, and additive white Gaussian noise is received. Frequency domain equalization is performed on the received signal after CP removal, the signal after the frequency domain equalization is formed into a corresponding signal matrix, corresponding transpose is performed on the signal matrix, and then the single-level DWT is performed on each column of the signal matrix. Finally, desired information is obtained through QAM signal demapping.

For ease of description, BER and peak to average power ratio (peak to average power ratio, PAPR, PAPR for short) performance in the technical solution provided in Embodiment 1 of this application is compared with BER and PAPR performance of an OFDM system by using the block diagram of modulation and demodulation shown in FIG. 15 as an example to perform BER and PAPR performance simulation.

Figure 16A:
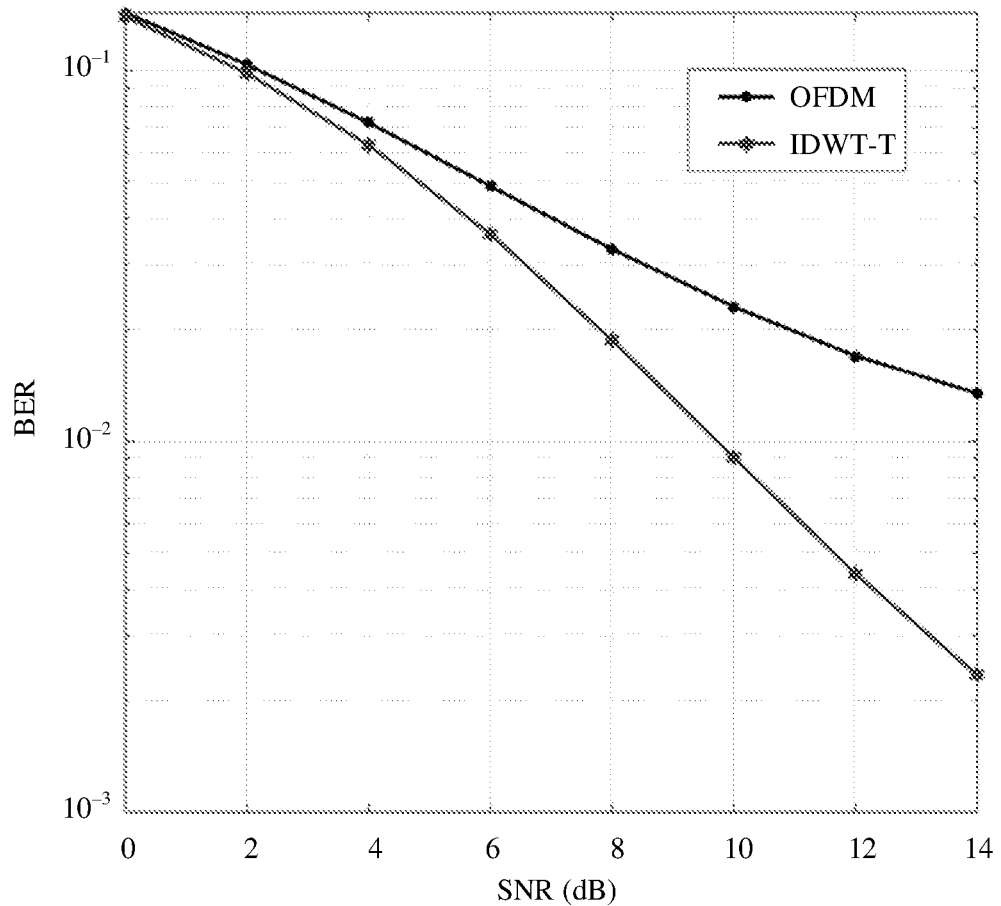
FIG. 16A is a diagram 1 of BER performance comparison according to an embodiment of this application.

FIG. 16A is a diagram 1 of BER performance comparison according to an embodiment of this application. It can be learned from FIG. 16A that the transmit end uses a data processing manner of the single-level IDWT plus the transpose function (that is, IDWT-T) to obtain BER performance in a time-frequency double dispersive channel. The BER performance is better than that of the OFDM system in the time-frequency double dispersive channel (that is, the BER value is smaller under a same signal-to-noise ratio (signal-to-noise-ratio, SNR)).

Key simulation conditions in FIG. 16A include: A fast Fourier transform (fast Fourier transform, FFT) length (FFT length) is equal to 512; an IDWT data matrix (IDWT-T data matrix) of the transmit end is 4*512; DWT-IDWT uses Haar (Haar transform); filter coefficients (filter coefficients) h0=[0.707 0.707], h1=[−0.707 0.707], g0=[0.707 0.707], and g1=[0.707−0.707], where h0 represents the filter coefficient of an LPF, h1 represents the filter coefficient of an HPF, g0 represents the filter coefficient of an ILPF, and g1 represents the filter coefficient of an ILPF; quadrature phase shift keying (quadrature phase shift keying, QPSK) modulation; a carrier frequency f is 2 GHz; a subcarrier spacing (SCS) is 15 kHz; a time domain sampling interval Ts is 32.5 ns; delay taps (delay taps) is [0 5 11 17]; a Doppler tap (Doppler tap) is [0.0180 0.009 0.008 0] *SCS; a channel coefficient (channel coefficient) is [1 sqrt (0.5) sqrt (0.25) sqrt (0.15)]; ideal channel estimation (ideal channel estimation); and a UE velocity (UE velocity) is 144 km/h (unit: km/h).

Figure 16B:
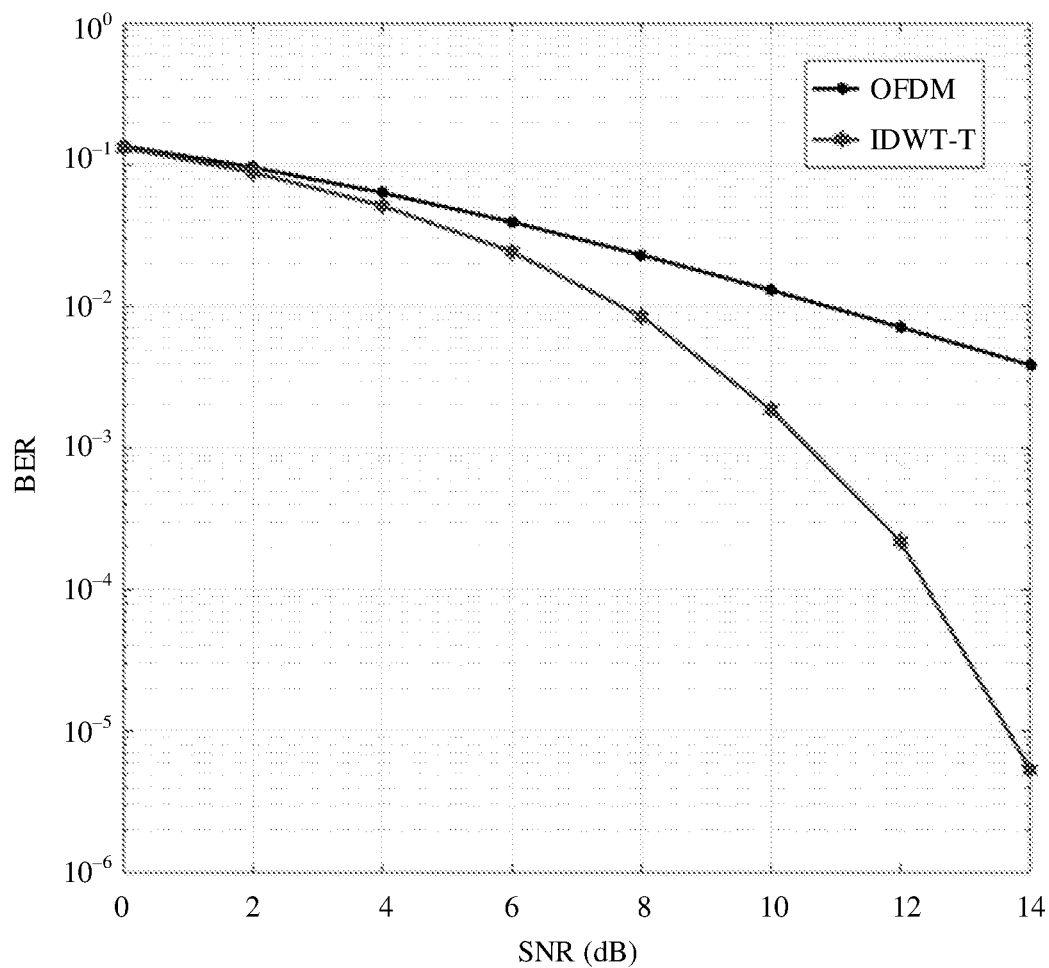
FIG. 16B is a diagram 2 of BER performance comparison according to an embodiment of this application.

FIG. 16B is a diagram 2 of BER performance comparison according to an embodiment of this application. Simulation comparison is performed on a smaller Doppler spread, and a simulation result is shown in FIG. 16B. Other simulation conditions in simulation conditions of FIG. 16B except a Doppler tap and a UE velocity are the same as the simulation conditions of FIG. 16A. The Doppler tap of FIG. 16B is [0.0032 0.0021 0.0013 0.001]*SCS, and the UE velocity of FIG. 16B is 25.92 km/h. It can be learned from FIG. 16B that, under a condition of the small Doppler spread, the BER performance of the data processing manner in which the transmit end uses the single-level IDWT plus the transpose function is still better (or the BER value is lower) than that of the OFDM system under the same condition.

Figure 16C:
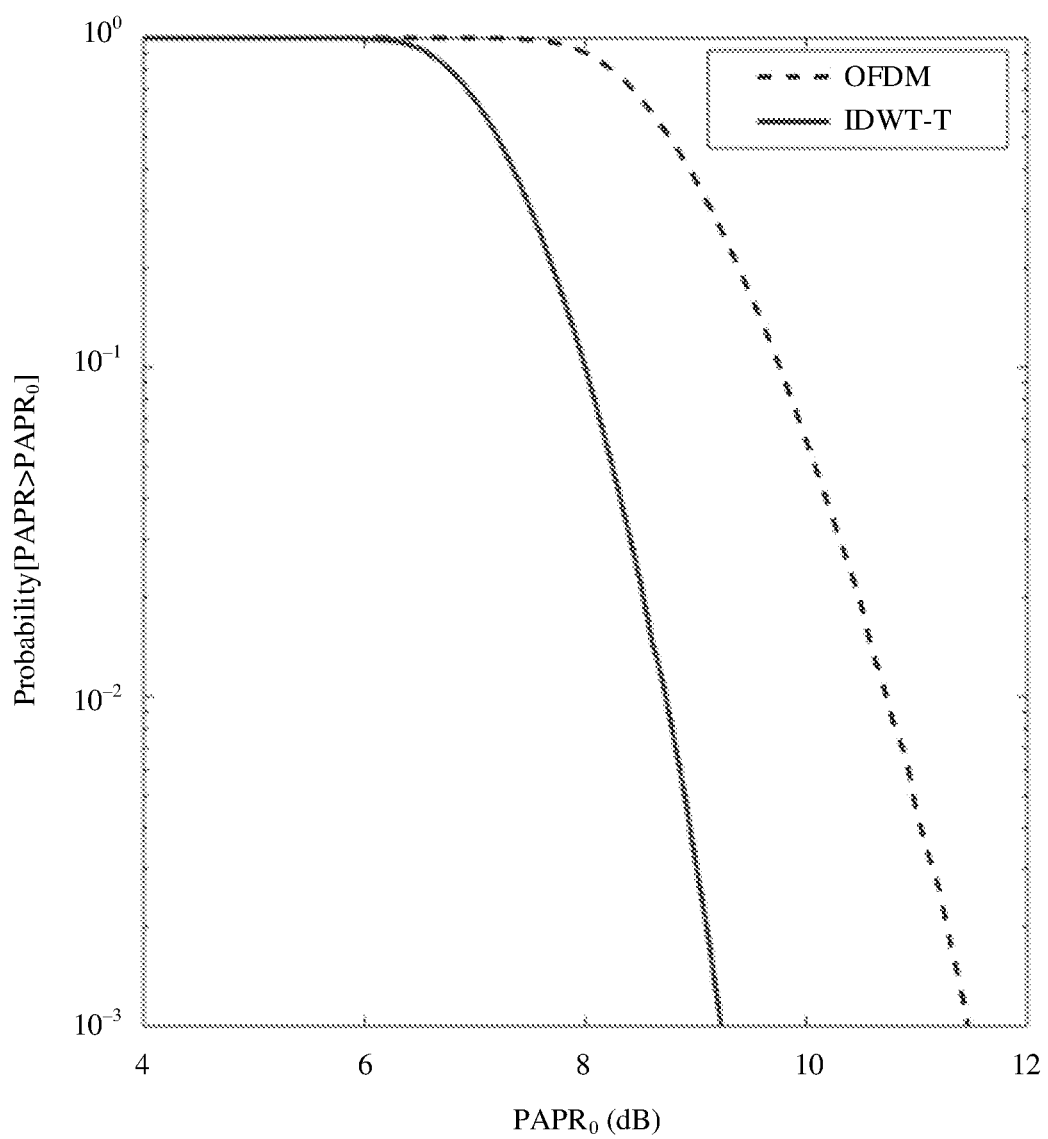
FIG. 16C is a diagram of PAPR performance comparison according to an embodiment of this application.

FIG. 16C is a diagram of PAPR performance comparison according to an embodiment of this application. FIG. 16C uses same simulation conditions as FIG. 16A. It can be learned from FIG. 16C that the PAPR performance of a data processing manner (namely, IDWT-T) in which the transmit end uses the single-level IDWT plus the transpose function is better (or the PAPR value is lower) than that of the OFDM system under a same condition.

It can be learned that, in the signal processing method provided in this embodiment of this application, a combination of the DWT and transpose is used at the receive end, and the frequency domain equalization is used at the receive end, so that better anti-time-frequency double dispersion performance can be achieved in a low complexity manner, and better PAPR performance can be obtained.

Figure 17A:
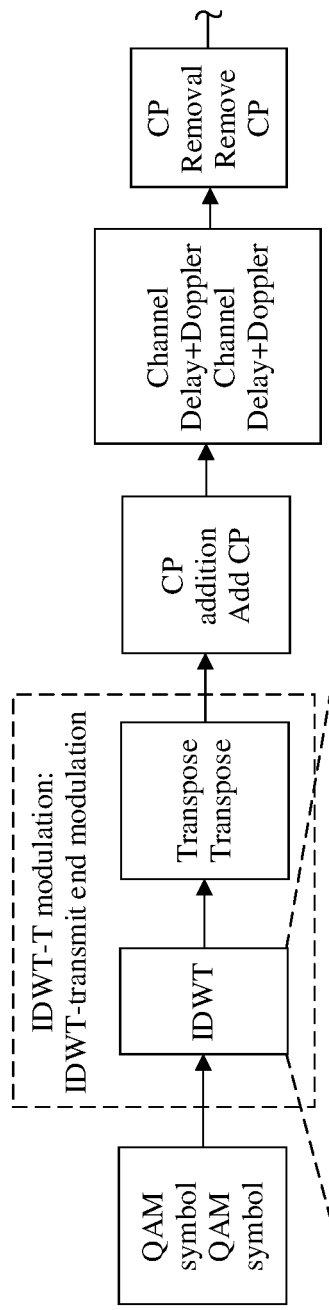
FIG. 17A and FIG. 17B are another block diagram of modulation and demodulation according to an embodiment of this application.
Figure 17A:
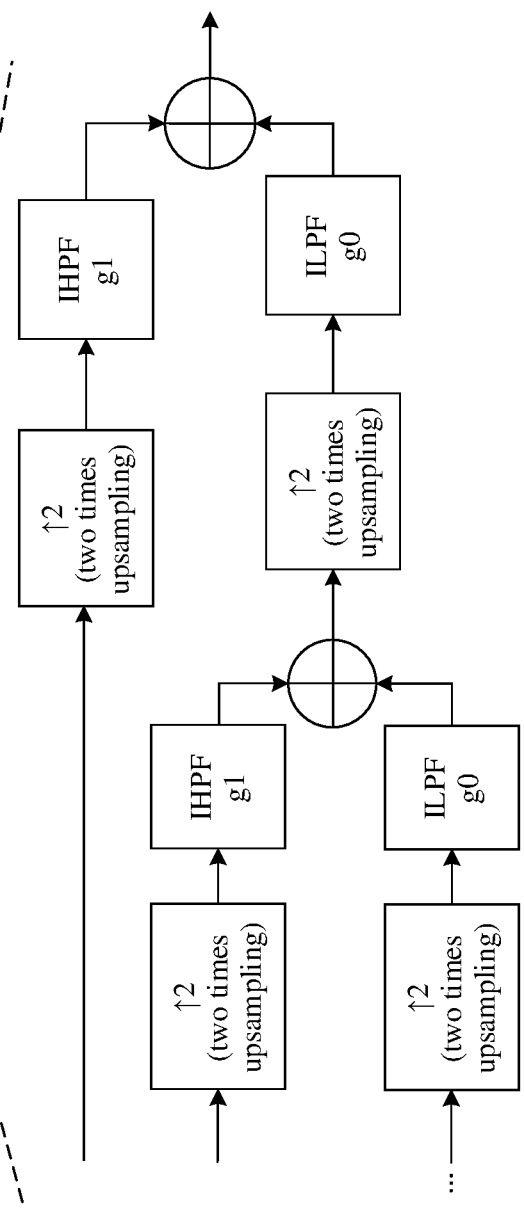
Figure 17B:
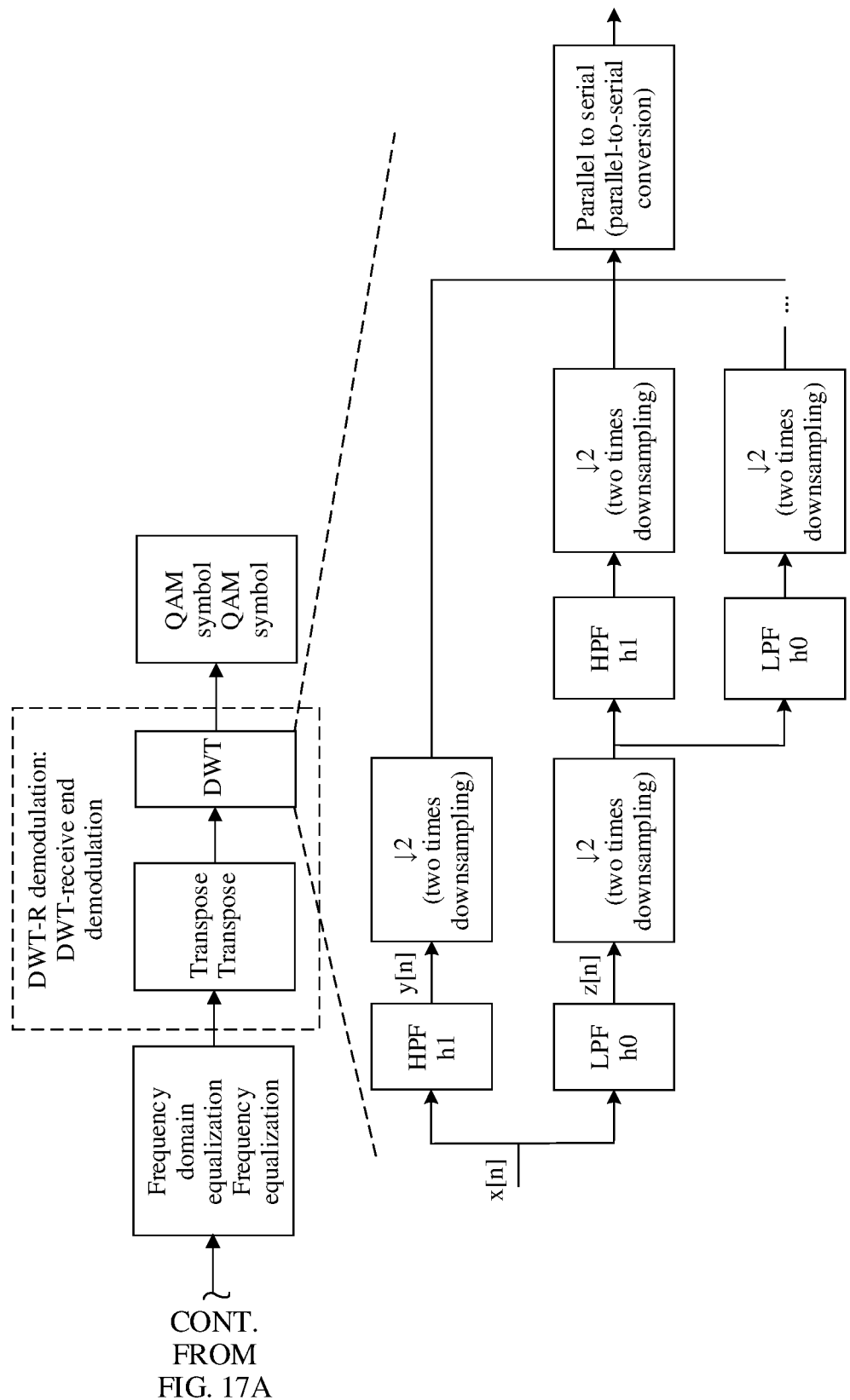

In another example, FIG. 17A and FIG. 17B are another block diagram of modulation and demodulation according to an embodiment of this application. In the block diagram of modulation and demodulation, two-level IDWT is used at a transmit end, and two-level DWT is used at a receive end. At the transmit end, a plurality of QAM symbols divided into groups are separately processed by a multi-level IDWT module, a signal matrix is formed with elements obtained by using each group of QAM symbols that are processed by the IDWT as columns, and then a transpose operation is performed on the signal matrix. Then, a CP is added in a unit of columns of the signal matrix, that is, a column of the signal matrix is used as a symbol and a CP is added to the symbol, to obtain a transmit signal, and then the transmit signal is transmitted. Alternatively, a CP is added in a unit of the signal matrix, that is, a signal vector is formed based on the column of the signal matrix, and a CP is added to the signal vector. In this example, that the CP is added in the unit of the columns is used for description. At the receive end, a signal affected by a multipath delay, Doppler impact, and additive white Gaussian noise is received. Frequency domain equalization is performed on the received signal after CP removal, the signal after the frequency domain equalization is formed into a corresponding signal matrix, corresponding transpose is performed on the signal matrix, and then multi-level DWT is performed on each column of the signal matrix. Finally, desired information is obtained through QAM signal demapping.

Figure 18:
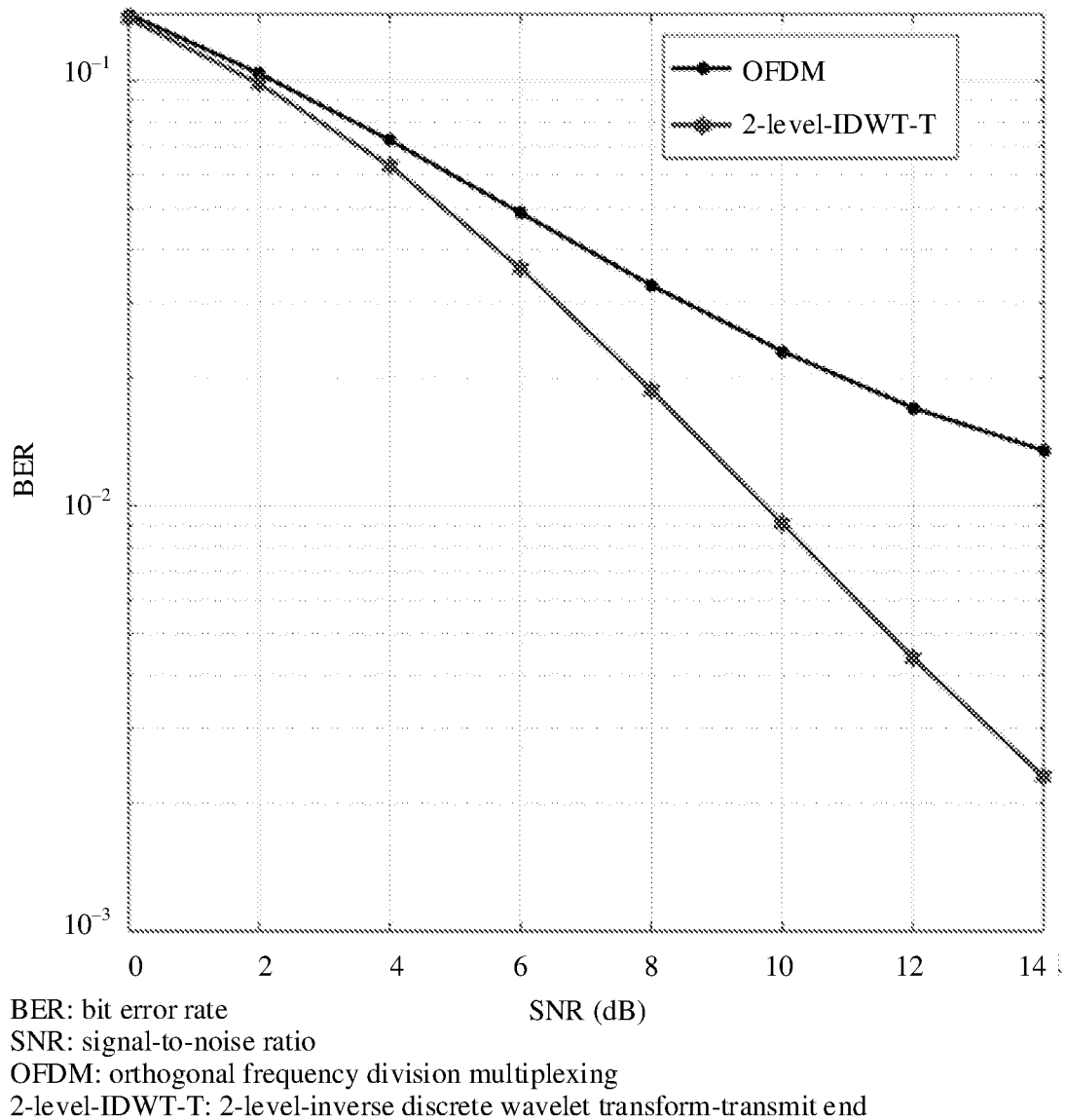
FIG. 18 is a diagram 3 of BER performance comparison according to an embodiment of this application.

For better description, BER performance of the technical solution provided in this embodiment of this application is compared with that of an OFDM system by using the block diagram of modulation and demodulation shown in FIG. 17A and FIG. 17B as an example to perform BER performance simulation. FIG. 18 is a diagram 3 of BER performance comparison according to an embodiment of this application. Simulation conditions of FIG. 18 are the same as the simulation conditions of FIG. 16A. It can be learned from FIG. 18 that BER performance in a time-frequency double dispersive channel by using a data processing manner of the single-level IDWT plus the transpose function (that is, IDWT-T) is better than that of the OFDM system in the time-frequency double dispersive channel (that is, the BER value is smaller).

It can be learned that in the signal processing method provided in this embodiment of this application, multi-level IDWT is used at the transmit end, and multi-level DWT is used at the receive end. Therefore, good anti-time-frequency double dispersion performance can still be achieved.

Embodiment 2

In Embodiment 2 of this application, a signal is processed at a transmit end by using DWT and a transpose operation, and a corresponding apparatus operation and IDWT are used at a receive end to process a received signal, so that Doppler impact on the signal sent by the transmit end on a radio channel is averaged or randomized, and a signal on each carrier can be more evenly affected during decoding at the receive end. Therefore, decoding performance of the receive end and communication reliability are improved.

Figure 19:
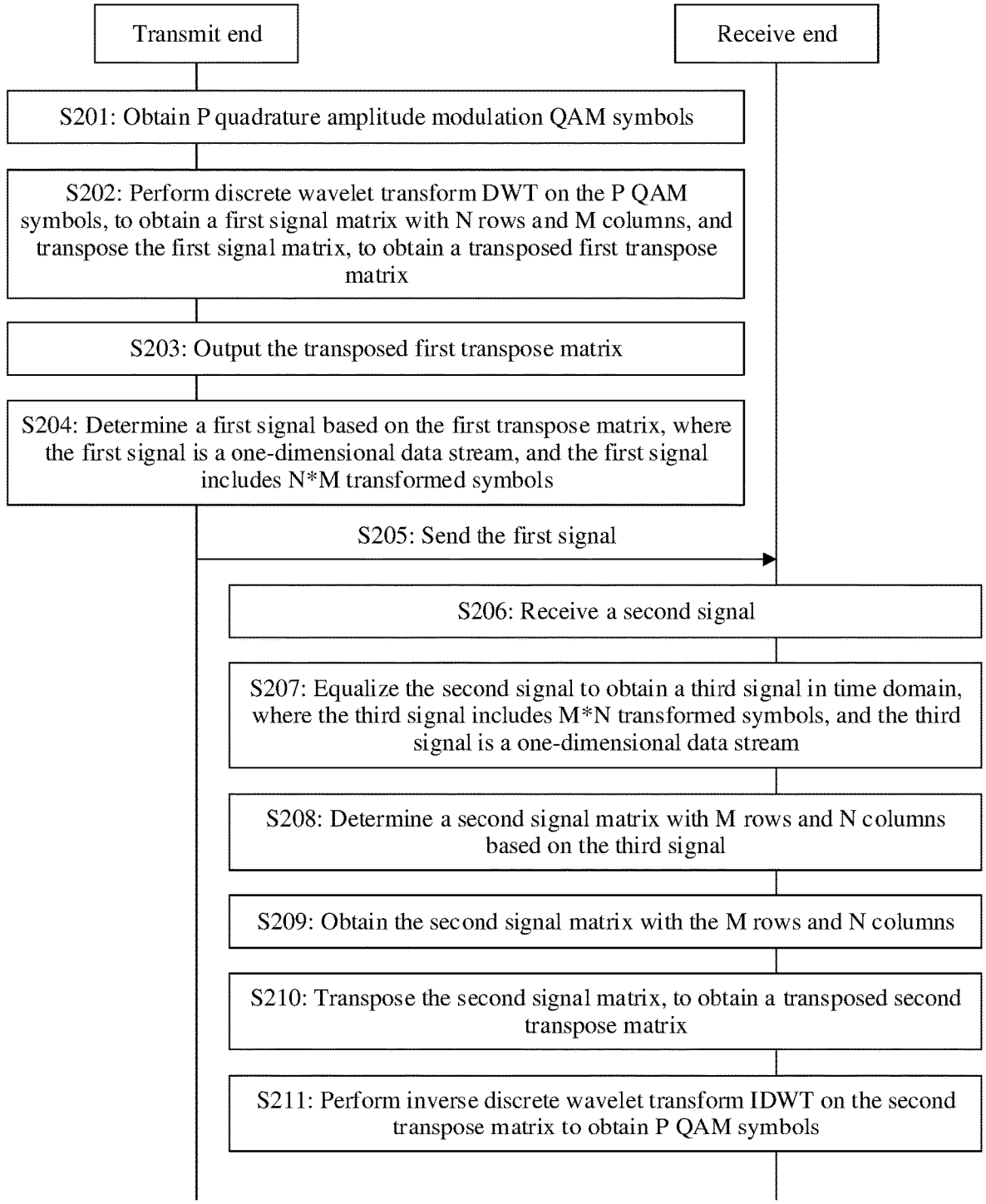
FIG. 19 is another schematic flowchart of a signal processing method according to an embodiment of this application.

FIG. 19 is another schematic flowchart of a signal processing method according to an embodiment of this application. As shown in FIG. 19, the signal processing method includes but is not limited to the following steps.

S201: A transmit end obtains P quadrature amplitude modulation QAM symbols.

S202: The transmit end performs discrete wavelet transform DWT on the P QAM symbols, to obtain a first signal matrix with N rows and M columns, and transposes the first signal matrix, to obtain a transposed first transpose matrix.

S203: The transmit end outputs the transposed first transpose matrix.

S204: The transmit end determines a first signal based on the first transpose matrix, where the first signal is a one-dimensional data stream, and the first signal includes N*M transformed symbols.

S205: The transmit end sends the first signal.

S206: A receive end receives a second signal.

S207: The receive end equalizes the second signal to obtain a third signal in time domain, where the third signal includes M*N transformed symbols, and the third signal is a one-dimensional data stream.

S208: The receive end determines a second signal matrix with M rows and N columns based on the third signal.

S209: The receive end obtains the second signal matrix with the M rows and N columns.

S210: Transpose the second signal matrix, to obtain a transposed second transpose matrix.

S211: Perform inverse discrete wavelet transform IDWT on the second transpose matrix to obtain P QAM symbols.

Specifically, for implementations of step S201 to step S211 in Embodiment 2 of this application, refer to the descriptions of step S101 to step S111 in Embodiment 1. Details are not described herein again.

In an example, FIG. 20 is still another block diagram of modulation and demodulation according to an embodiment of this application. As shown in FIG. 20, in the block diagram of modulation and demodulation, DWT is used at a transmit end, and IDWT is used at a receive end. At the transmit end, a plurality of QAM symbols divided into groups are separately processed by a DWT module, a signal matrix is formed with elements obtained by using each group of QAM symbols that are processed by the DWT as columns, and then a transpose operation is performed on the signal matrix. Then, a CP is added in a unit of columns of the signal matrix, that is, a column of the signal matrix is used as a symbol and a CP is added to the symbol, to obtain a transmit signal, and then the transmit signal is transmitted. Alternatively, a CP is added in a unit of the signal matrix, that is, a signal vector is formed based on the column of the signal matrix, and a CP is added to the signal vector. In this example, that the CP is added in the unit of the columns is used for description. At the receive end, a signal affected by a multipath delay, Doppler impact, and additive white Gaussian noise is received. Frequency domain equalization is performed on the received signal after CP removal, the signal after the frequency domain equalization is formed into a corresponding signal matrix, corresponding transpose is performed on the signal matrix, and then the IDWT is performed on each column of the signal matrix. Finally, desired information is obtained through QAM signal demapping.

Figure 21:
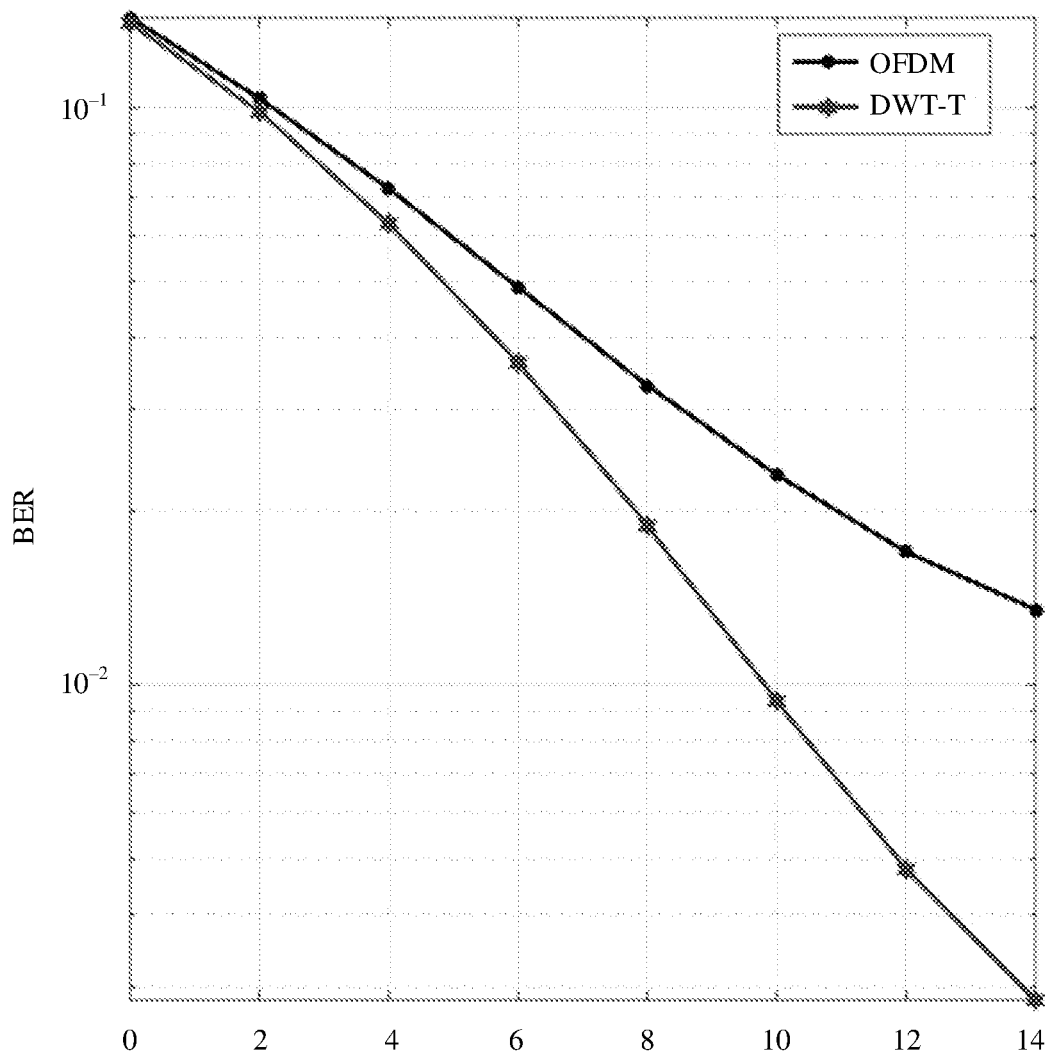
FIG. 21 is a diagram 4 of BER performance comparison according to an embodiment of this application.

For better description, BER performance of the technical solution provided in this embodiment of this application is compared with that of an OFDM system by using the block diagram of modulation and demodulation shown in FIG. 20 as an example to perform BER performance simulation. FIG. 21 is a diagram 4 of BER performance comparison according to an embodiment of this application. Simulation conditions of FIG. 21 are the same as the simulation conditions of FIG. 16A. It can be learned from FIG. 21 that BER performance in a time-frequency double dispersive channel by using a data processing manner of the DWT plus the transpose function (that is, DWT-T) is better than that of the OFDM system in the time-frequency double dispersive channel (that is, the BER value is smaller).

It can be learned that in this embodiment of this application, the signal is processed at the transmit end by using the DWT and transpose operation, and the corresponding apparatus operation and IDWT are used at the receive end to process the received signal, so that the Doppler impact on the signal sent by the transmit end on the radio channel can still be averaged or randomized, and the signal on each carrier can be more evenly affected during the decoding at the receive end. Therefore, impact of time-frequency double dispersion on the receive end can be reduced, and the decoding performance of the receive end and the communication reliability are improved.

The foregoing content describes in detail the method in this application. To better implement the foregoing solutions in embodiments of this application, embodiments of this application further provide corresponding apparatuses or devices.

Figure 22:
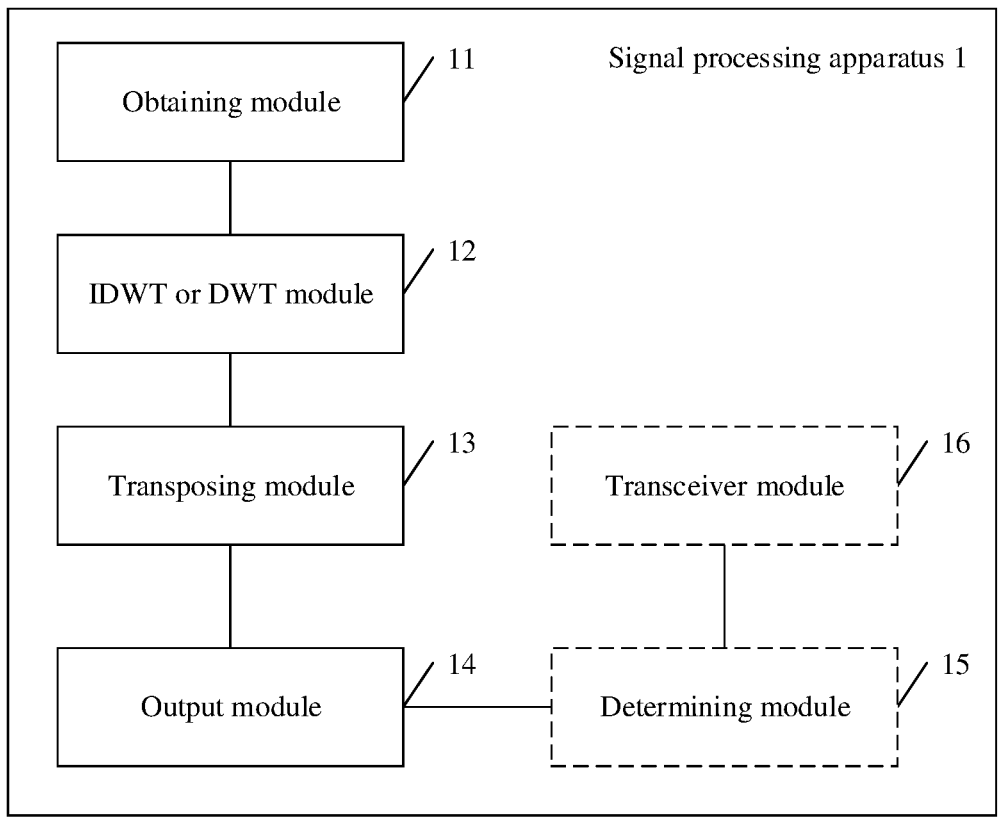
FIG. 22 is a schematic diagram of a structure of a signal processing apparatus according to an embodiment of this application.

FIG. 22 is a schematic diagram of a structure of a signal processing apparatus according to an embodiment of this application. The signal processing apparatus may be a communication device, or a chip or a circuit that may be disposed in the communication device. As shown in FIG. 22, a signal processing apparatus 1 may include the following modules.

An obtaining module 11, configured to obtain P QAM symbols; an IDWT or a DWT module 12, configured to perform IDWT or DWT on the P QAM symbols, to obtain a first signal matrix with N rows and M columns, where P, N, and M are all positive integers; a transposing module 13, configured to transpose the first signal matrix, to obtain a transposed first transpose matrix; and an output module 14, configured to output the transposed first transpose matrix.

Optionally, one column of the first signal matrix is obtained by performing the IDWT or the DWT on N QAM symbols in the P QAM symbols; or one row of the first signal matrix is obtained by performing the IDWT or the DWT on M QAM symbols in the P QAM symbols.

Optionally, the signal processing apparatus 1 may further include a determining module 15 and a transceiver module 16. The determining module 15 is configured to determine a first signal based on the first transpose matrix, where the first signal is a one-dimensional data stream, and the first signal includes N*M transformed symbols; and the transceiver module 16 is configured to send the first signal.

Optionally, the determining module 15 is specifically configured to: output the first signal based on a column of the first transpose matrix; or output the first signal based on a row of the first transpose matrix.

The obtaining module 11, the IDWT or DWT module 12, the transposing module 13, the output module 14, and the determining module 15 may be integrated into one module, for example, a processing module.

In specific implementation, for implementation of each module or unit, correspondingly refer to the corresponding descriptions of the transmit end in Embodiment 1 or 2, and execute the method and functions performed by the transmit end in Embodiment 1 or 2.

Figure 23:
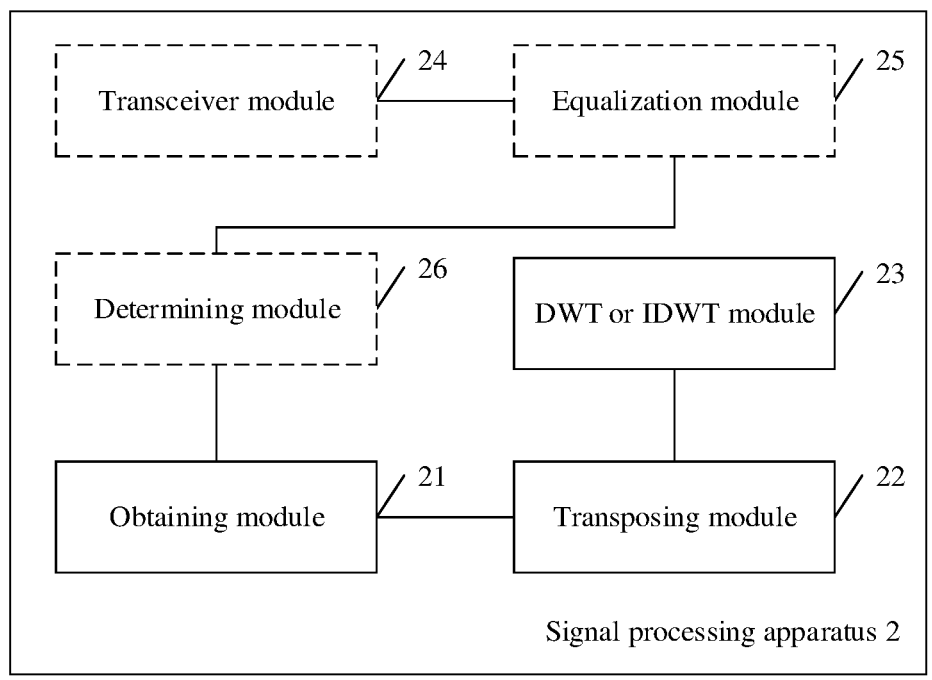
FIG. 23 is another schematic diagram of a structure of a signal processing apparatus according to an embodiment of this application.

FIG. 23 is another schematic diagram of a structure of a signal processing apparatus according to an embodiment of this application. The signal processing apparatus may be a communication device, or a chip or a circuit that may be disposed in the communication device. As shown in FIG. 23, a signal processing apparatus 2 may include the following modules.

An obtaining module 21, configured to obtain a second signal matrix with M rows and N columns; a transposing module 22, configured to transpose the second signal matrix, to obtain a transposed second transpose matrix; a DWT or an IDWT module 23, configured to perform discrete wavelet transform DWT or inverse discrete wavelet transform IDWT on the second transpose matrix, to obtain P QAM symbols, where P, N and M are all positive integers.

Optionally, the signal processing apparatus 2 may further include a transceiver module 24, an equalization module 25, and a determining module 26. The transceiver module 24 is configured to receive a second signal; the equalization module 25 is configured to equalize the second signal to obtain a third signal in time domain, where the third signal includes M*N transformed symbols, and the third signal is a one-dimensional data stream; and the determining module 26 is configured to determine the second signal matrix with the M rows and N columns based on the third signal.

Optionally, the determining module 26 is specifically configured to: generate the second signal matrix with the M rows and N columns by using every M symbols in the third signal as one column; or generate the second signal matrix with the M rows and N columns by using every N symbols in the third signal as one row.

Optionally, the second transpose matrix has N rows and M columns. N QAM symbols in the P QAM symbols are obtained by performing the DWT or the IDWT on one column of the second transpose matrix; or M QAM symbols in the P QAM symbols are obtained by performing the DWT or the IDWT on one row of the second transpose matrix.

The obtaining module 21, the transposing module 22, the DWT or IDWT module 23, the equalization module 25, and the determining module 26 may be integrated into one module, for example, a processing module.

In specific implementation, for implementation of each module or unit, correspondingly refer to the corresponding descriptions of the receive end in Embodiment 1 or 2, and execute the method and functions performed by the receive end in Embodiment 1 or 2.

Figure 24:
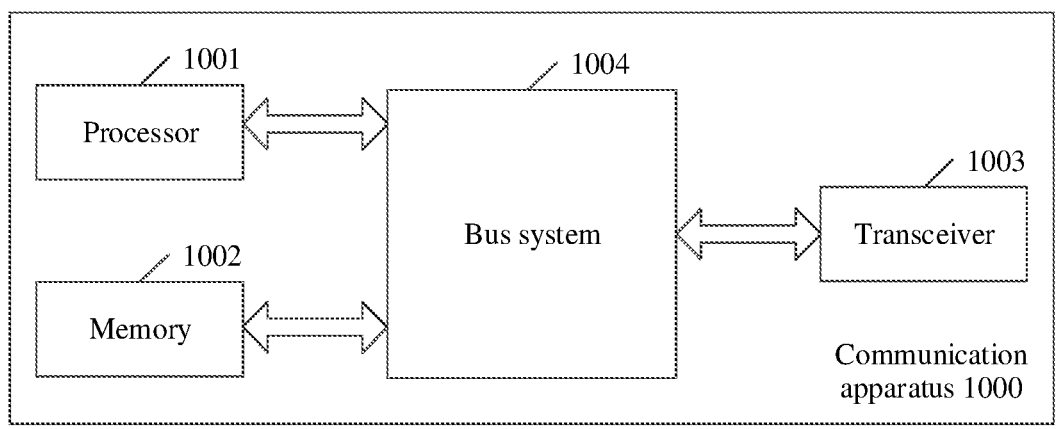
FIG. 24 is a schematic diagram of a structure of a communication apparatus according to an embodiment of this application.

FIG. 24 is a schematic diagram of a structure of a communication apparatus according to an embodiment of this application. As shown in FIG. 24, a communication apparatus 1000 provided in this embodiment of this application includes a processor 1001, a memory 1002, a transceiver 1003, and a bus system 1004. The communication apparatus provided in this embodiment of this application may be either the foregoing signal processing apparatus 1 or the foregoing signal processing apparatus 2.

The processor 1001, the memory 1002, and the transceiver 1003 are connected through the bus system 1004.

The memory 1002 is configured to store a program. Specifically, the program may include program code, and the program code includes computer operation instructions. The memory 1002 includes but is not limited to a random access memory (RAM), a read-only memory (ROM), an erasable programmable read-only memory (EPROM), or a compact disc read-only memory (CD-ROM). FIG. 24 shows only one memory. Certainly, a plurality of memories may alternatively be disposed as required. The memory 1002 may alternatively be a memory in the processor 1001. This is not limited herein.

The memory 1002 stores the following elements, an executable unit or a data structure, a subset thereof, or an extended set thereof: operation instructions, including various operation instructions and used to implement various operations; and an operating system, including various system programs and configured to implement various basic services and process a hardware-based task.

The processor 1001 controls an operation of the communication apparatus 1000. The processor 1001 may be one or more central processing units (CPU). When the processor 1001 is one CPU, the CPU may be a single-core CPU, or may be a multi-core CPU.

During specific application, components of the communication apparatus 1000 are coupled together by using the bus system 1004. In addition to a data bus, the bus system 1004 may further include a power bus, a control bus, a status signal bus, and the like. However, for clear description, various buses in FIG. 24 are marked as the bus system 1004. For ease of illustration, FIG. 24 merely shows an example of the bus system.

The method at the transmit end provided in any one of the foregoing embodiments, or the method at the receive end provided in any one of the foregoing embodiments may be applied to the processor 1001, or implemented by the processor 1001. The processor 1001 may be an integrated circuit chip and has a signal processing capability. In an implementation process, the steps of the foregoing methods may be completed by using a hardware integrated logic circuit in the processor 1001, or by using instructions in a form of software. The foregoing processor 1001 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor, or the like. The steps of the methods disclosed with reference to embodiments of this application may be directly executed and completed by a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1002. The processor 1001 reads information in the memory 1002, and performs, in combination with the hardware of the processor 1001, the method steps of the transmit end described in any one of the foregoing embodiments, or performs, in combination with hardware of the processor 1001, the method steps of the receive end described in any one of the foregoing embodiments.

An embodiment of this application further provides a computer program product. The computer program product includes computer program code. When the computer program code is run on a computer, the computer is enabled to perform the method steps of the transmit end described in any one of the foregoing embodiments; or when the computer program code is run on a computer, the computer is enabled to perform the method steps of the receive end described in any one of the foregoing embodiments.

An embodiment of this application further provides an apparatus. The apparatus may be a chip. The chip includes a processor. The processor is configured to read and execute a computer program stored in a memory, to perform the signal processing method in any possible implementation of any one of the foregoing embodiments. Optionally, the chip further includes the memory, and the memory is connected to the processor through a circuit or a wire. Further, optionally, the chip may further include a communication interface, and the processor is connected to the communication interface. The communication interface is configured to receive data and/or a signal that need/needs to be processed. The processor obtains the data and/or the signal from the communication interface, processes the data and/or the signal, and outputs a processing result through the communication interface. The communication interface may be an input/output interface.

Optionally, the processor and the memory may be physically independent units, or the memory may be integrated with the processor.

In another embodiment of this application, a communication system is further provided. The communication system includes a terminal device and a network device. For example, the terminal device may be the receive end in any one of the foregoing embodiments, and the network device may be the transmit end in any one of the foregoing embodiments.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   obtaining, by a transmit end, P quadrature amplitude modulation (QAM) symbols;
   performing, by the transmit end, inverse discrete wavelet transform (IDWT) or discrete wavelet transform (DWT) on the P QAM symbols, to obtain a first signal matrix with N rows and M columns, wherein P, N, and M are all positive integers;

transposing the first signal matrix, by the transmit end, to obtain a transposed first transpose matrix; and outputting, by the transmit end, the transposed first transpose matrix.

2. The method according to claim 1, wherein:
a first column of the first signal matrix is obtained by performing the IDWT or the DWT on N QAM symbols in the P QAM symbols; or
a first row of the first signal matrix is obtained by performing the IDWT or the DWT on M QAM symbols in the P QAM symbols.

3. The method according to claim 1, wherein after outputting the transposed first transpose matrix, the method further comprises:
determining a first signal based on the first transpose matrix, wherein the first signal is a one-dimensional data stream, and the first signal comprises N*M transformed symbols; and
sending the first signal.

4. The method according to claim 3, wherein determining the first signal based on the first transpose matrix comprises:
outputting the first signal based on a column of the first transpose matrix; or
outputting the first signal based on a row of the first transpose matrix.

5. The method according to claim 1, further comprising:
obtaining, by a receive end, a second signal matrix with M rows and N columns;
transposing the second signal matrix, to obtain a transposed second transpose matrix; and
performing DWT or IDWT on the second transpose matrix, to obtain the P QAM symbols.

6. The method according to claim 5, wherein before obtaining the second signal matrix, the method further comprises:
receiving, by the receive end, a second signal;
equalizing the second signal to obtain a third signal in time domain, wherein the third signal comprises M*N transformed symbols, and the third signal is a one-dimensional data stream; and
determining the second signal matrix with the M rows and N columns based on the third signal.

7. The method according to claim 6, wherein determining the second signal matrix with the M rows and N columns based on the third signal comprises:
generating the second signal matrix with the M rows and N columns by using every M symbols in the third signal as one column; or
generating the second signal matrix with the M rows and N columns by using every N symbols in the third signal as one row.

8. The method according to claim 5, wherein the second transpose matrix has N rows and M columns; and
wherein:
N QAM symbols in the P QAM symbols are obtained by performing the DWT or the IDWT on one column of the second transpose matrix; or
M QAM symbols in the P QAM symbols are obtained by performing the DWT or the IDWT on one row of the second transpose matrix.

9. An apparatus, comprising:
a processor; and
a memory storing a program that is executable by the processor, the program including instructions to:
obtain P quadrature amplitude modulation (QAM) symbols;
perform inverse discrete wavelet transform (IDWT) or discrete wavelet transform (DWT) on the P QAM symbols, to obtain a first signal matrix with N rows and M columns, wherein P, N, and M are all positive integers;
transpose the first signal matrix, to obtain a transposed first transpose matrix; and
output the transposed first transpose matrix.

10. The apparatus according to claim 9, wherein:
a first column of the first signal matrix is obtained by performing the IDWT or the DWT on N QAM symbols in the P QAM symbols.

11. The apparatus according to claim 9, wherein:
a first row of the first signal matrix is obtained by performing the IDWT or the DWT on M QAM symbols in the P QAM symbols.

12. The apparatus according to claim 9, wherein the program further includes instructions to:
determine a first signal based on the first transpose matrix, wherein the first signal is a one-dimensional data stream, and the first signal comprises N*M transformed symbols; and
send the first signal.

13. The apparatus according to claim 12, wherein determining the first signal based on the first transpose matrix comprises:
outputting the first signal based on a column of the first transpose matrix.

14. The apparatus according to claim 12, wherein determining the first signal based on the first transpose matrix comprises:
outputting the first signal based on a row of the first transpose matrix.

15. An apparatus, comprising:
a processor; and
a memory storing a program that is executable by the processor, the program including instructions to:
obtain a second signal matrix with M rows and N columns;
transpose the second signal matrix, to obtain a transposed second transpose matrix; and
perform discrete wavelet transform (DWT) or inverse discrete wavelet transform IDWT on the second transpose matrix, to obtain P quadrature amplitude modulation (QAM) symbols, wherein P, N, and M are all positive integers.

16. The apparatus according to claim 15, wherein the program further includes instructions to:
receive a second signal;
equalize the second signal to obtain a third signal in time domain, wherein the third signal comprises M*N transformed symbols, and the third signal is a one-dimensional data stream; and
determine the second signal matrix with the M rows and N columns.

17. The apparatus according to claim 16, wherein determining the second signal matrix comprises:
generating the second signal matrix with the M rows and N columns using every M symbols in the third signal as one column.

18. The apparatus according to claim 16, wherein determining the second signal matrix comprises:
generating the second signal matrix with the M rows and N columns using every N symbols in the third signal as one row.

19. The apparatus according to claim 15, wherein the second transpose matrix has N rows and M columns; and wherein:
N QAM symbols in the P QAM symbols are obtained by performing the DWT or the IDWT on one column of the second transpose matrix.

20. The apparatus according to claim 15, wherein the second transpose matrix has N rows and M columns; and wherein:
M QAM symbols in the P QAM symbols are obtained by performing the DWT or the IDWT on one row of the second transpose matrix.

* * * * *